United States Patent
Swager

(10) Patent No.: US 8,974,873 B2
(45) Date of Patent: Mar. 10, 2015

(54) DEVICES AND METHODS INVOLVING POLYMERS ALIGNED VIA INTERCHAIN INTERACTIONS

(75) Inventor: Timothy M. Swager, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 989 days.

(21) Appl. No.: 12/312,256

(22) PCT Filed: Oct. 31, 2007

(86) PCT No.: PCT/US2007/022953
§ 371 (c)(1),
(2), (4) Date: Dec. 7, 2009

(87) PCT Pub. No.: WO2008/057346
PCT Pub. Date: May 15, 2008

(65) Prior Publication Data
US 2010/0091222 A1 Apr. 15, 2010

Related U.S. Application Data

(60) Provisional application No. 60/855,910, filed on Nov. 1, 2006, provisional application No. 61/007,927, filed on Dec. 18, 2006.

(51) Int. Cl.
*C09K 19/00* (2006.01)
*C09K 19/12* (2006.01)
(Continued)

(52) U.S. Cl.
CPC ............. *C09K 19/12* (2013.01); *C09K 19/3003* (2013.01); *C09K 19/32* (2013.01);
(Continued)

(58) Field of Classification Search
USPC .............. 428/1.1; 349/88; 252/299.1, 299.61, 252/299.62, 299.6, 299.01, 582; 528/423, 528/422, 363
See application file for complete search history.

(56) References Cited

U.S. PATENT DOCUMENTS 5,139,696 A    8/1992  Frechet et al.
6,320,018 B1 * 11/2001  Sijbesma et al. .............. 528/310
(Continued)

FOREIGN PATENT DOCUMENTS

JP    09-132777    5/1997
JP    04-035853    2/2004
JP    05-047810    2/2005

OTHER PUBLICATIONS

Beijer, F. et al., "Strong Dimerization of Ureidopyrimidones via Quadruple Hydrogen Bonding," *J Am. Chem. Soc.* 1998, 120, 6761.
(Continued)

*Primary Examiner* — Gwendolyn Blackwell
*Assistant Examiner* — Ruiyun Zhang
(74) *Attorney, Agent, or Firm* — Wolf, Greenfield & Sacks, P.C.

(57) ABSTRACT

The present invention provides compositions, devices and methods related to the alignment of materials including polymers. In some cases, the present invention comprises the assembly of molecules (e.g., polymers) via intermolecular interactions to produce extended networks, which may have enhanced properties relative to the individual molecules. Such networks may be advantageous for use in electronics, photovoltaics, sensor applications, and the like. In some embodiments, the present invention may enhance the performance of certain optical devices, such as liquid crystal displays (e.g., color liquid crystal displays) by providing enhanced contrast ratio, faster response times, and/or lower operating voltage.

34 Claims, 14 Drawing Sheets

(51) Int. Cl.
C09K 19/30 (2006.01)
C09K 19/32 (2006.01)
C09K 19/34 (2006.01)
C09K 19/56 (2006.01)
G02F 1/1334 (2006.01)

(52) U.S. Cl.
CPC ............ C09K19/3483 (2013.01); C09K 19/56 (2013.01); G02F 1/1334 (2013.01); *G02F 2001/13345* (2013.01)
USPC ...... 428/1.1; 349/88; 252/299.01; 252/299.6; 252/582; 582/363; 582/423

(56) References Cited

U.S. PATENT DOCUMENTS

| | | | |
|---|---|---|---|
| 6,783,814 | B2 | 8/2004 | Swager et al. |
| 7,462,325 | B2 | 12/2008 | Hancock et al. |
| 7,494,698 | B2 | 2/2009 | Swager et al. |
| 2002/0001052 | A1* | 1/2002 | Kornfield et al. ............... 349/88 |
| 2004/0170775 | A1* | 9/2004 | Swager et al. ................. 428/1.1 |
| 2005/0109985 | A1* | 5/2005 | Kataoka et al. ........ 252/299.01 |
| 2010/0025630 | A1 | 2/2010 | Swager et al. |

OTHER PUBLICATIONS

Breen, C. et al., "Polarized Photoluminescence from Poly(ρ-phenylene-ethynylene) via a Block Copolymer Nanotemplate," *J. Am. Chem. Soc.* 2003, 125, 9942.

Brunsveld, L. et al., "Supramolecular Polymers," *Chem. Rev.* 2001, 101, 4071.

Hirschberg, J. et al., "Supramolecular Polymers from Linear Telechelic Siloxanes with Quadruple-Hydrogen-Bonded Units," *Macromolecules* 1999, 32, 2696.

Hoogboom, J. et al., "Increased Alignment of Electronic Polymers in Liquid Crystals via Hydrogen Bonding Extension," *J. Am. Chem. Soc.* 2006, 128(47), 15058.

Ishow, E. et al., "Anthryl-based poly(phenylene ethynylene)s: Tuning optical properties with Diels-Alder reactions," *Macromolecules* 2006, 39(23), 7854.

Long, T. et al., "Minimization of Free Volume: Alignment of Triptycenes in Liquid Crystals and Stretched Polymers," *Adv. Mater.* 2001, 13, 601.

Long, T. et al., "Using 'Internal Free Volume' to Increase Chromophore Alignment," *J. Am. Chem. Soc.* 2002, 124, 3826.

Montali, A. et al., "Polarizing energy transfer in photoluminescent materials for display applications," *Nature* 1998, 392, 261.

Nesterov, E. et al., "Conjugation Enhancement of Intramolecular Exciton Migration in Poly(ρ-phenylene-ethynylene)s," *J. Am. Chem. Soc.* 2005, 127, 10083.

Sijbesma, R. et al., "Reversible Polymers Formed from Self-Complementary Monomers Using Quadruple Hydrogen Bonding," *Science* 1997, 278, 1601.

Sijbesma, R., et al., "Quadruple hydrogen bonded systems," *Chem. Commun.* 2003, 5.

Thomas, S. et al., "Perpendicular Organization of Macromolecules: Synthesis and Alignment Studies of a Soluble Poly(iptycene)," *J. Am. Chem. Soc.* 2005, 127, 17976.

Weder, C. et al., "Incorporation of Photoluminescent Polarizers into Liquid Crystal Displays," *Science* 1998, 279, 835.

Zhu, Z. et al., "Conjugated Polymer Liquid Crystal Solutions: Control of Conformation and Alignment," *J. Am. Chem. Soc.* 2002, 124, 9670.

International Search Report and Written Opinion, mailed Sep. 10, 2008, in PCT/US2007/022965.

International Preliminary Report on Patentability, mailed May 5, 2009, in PCT/US2007/022965.

International Search Report and Written Opinion, mailed Sep. 4, 2008, in PCT/US2007/022953.

International Preliminary Report on Patentability, mailed May 5, 2009, in PCT/US2007/022953.

Database WPI Week 200519, AN 2005-176020 and Abstract for JP2005-047810.

* cited by examiner

Polymer P4

Polymer P5

DEVICES AND METHODS INVOLVING POLYMERS ALIGNED VIA INTERCHAIN INTERACTIONS

RELATED APPLICATIONS

This application is a National Stage of PCT/US2007/022953, filed Oct. 31, 2007 with priority to United States Provisional Application Ser. No. 60/855,910, filed Nov. 1, 2006, and United States Provisional Application Ser. No. 61/007,927, filed Dec. 18, 2006, the contents of which are incorporated herein by reference.

STATEMENT REGARDING FEDERALLY SPONSORED RESEARCH OR DEVELOPMENT

This invention was sponsored by the National Science Foundation under Grant Number DMR-0314421. The government has certain rights in the invention.

FIELD OF THE INVENTION

The present invention generally relates to compositions, devices, and methods involving the alignment of polymers.

BACKGROUND OF THE INVENTION

Liquid crystals are often employed in devices, such as liquid crystal displays (LCDs), which utilize the different optical properties of liquid crystalline molecules in either the presence or absence of, for example, an electric field. In one example, the liquid crystal material may be oriented in one liquid crystal phase in the absence of an electric field, wherein light is transmitted through the device and reflected back to the observer such that the device appears clear. The liquid crystal material may be reoriented in a different liquid crystal phase in the presence of an electric field, wherein light is no longer transmitted through the device such that the device appears dark. Thus, an electric field may be applied to switch the liquid crystal material between clear and dark (e.g., "on" and "off" states). In LCDs, images may be created using a plurality of individual picture elements or "pixels," wherein each pixel may contain a liquid crystal material which may be switched to form the image. In color LCDs, color filters or chromophores such as dyes may be incorporated within the device to generate the appearance of color within each pixel.

In many present day LCDs, the alignment of the liquid crystal material in the absence of an electric field may be determined by a surface in contact with the liquid crystal. The surface may be rubbed or otherwise treated such that the surface can orient the liquid crystal material in the absence of the electric field. In the presence of an electric field, the liquid crystal material may be switched to one state (e.g., "turn-on" event), and, upon subsequent removal of the electric field, the liquid crystal material may relax or decay to its original state (e.g., "turn-off" event). In such cases, the "turn-on" event may be fast because the switching of the liquid crystal is actively driven by an electric field. However, the "turn-off" event may be slow because the realignment of the liquid crystal by the treated surface often begins at the surface and must propagate into the bulk of the liquid crystal material. Additionally, many LCDs require an active electric field to keep the liquid crystal material in one of the two states (e.g., "on" or "off"), resulting in the need for a constant source of external energy.

Accordingly, improved devices and methods are needed.

SUMMARY OF THE INVENTION

The present invention relates to devices comprising a polymeric network comprising the assembly of a plurality of polymer molecules, wherein each polymer molecule comprises at least one intermolecular interacting group attached at or near a terminal end of the polymeric molecule, and wherein at least 50% of the plurality of polymer molecules are connected to an adjacent polymer molecule via the at least one interacting group, and a host material with which the polymeric network is mixed, wherein the polymeric network is capable of orienting the host material.

The present invention also provides methods for orienting a host material comprising providing a device comprising a polymeric network and a host material with which the polymeric network is mixed, wherein the host material has a first orientation; exposing the device to a source of energy to cause at least some of the host material to move from the first orientation to a second orientation; and removing the source of energy to cause the host material moved from the first to the second orientation to move from the second orientation to the first orientation, wherein the host material moves from the second orientation to the first orientation more rapidly than in a device essentially identical, but lacking the polymeric network, under essentially identical conditions.

The present invention also provides methods for orienting a host material comprising providing a device comprising a polymeric network and a host material with which the polymeric network is mixed, wherein the host material has a first orientation; exposing the device to a first source of energy to cause at least some of the host material to move from the first orientation to a second orientation; removing the source of energy such that the host material moved from the first to the second orientation remains substantially in the second orientation for a period of time; and exposing the device to a second source of energy to cause the host material moved from the first to the second orientation to return to the first orientation; wherein the polymeric network orients the host material in the second orientation for said period of time which is longer than a period of time during which the host material would remain in the second orientation in a device essentially identical, but lacking the polymeric network, under essentially identical conditions.

The present invention also relates to devices comprising a polymeric network comprising the assembly of a plurality of polymer molecules, wherein each polymer molecule comprises at least one intermolecular interacting group attached at or near a terminal end of the polymeric molecule, and wherein at least 50% of the plurality of polymer molecules are connected to an adjacent polymer molecule via the at least one interacting group; a host material with which the polymeric network is mixed, wherein the polymeric network is capable of orienting the host material; and at least one surface in contact with the polymeric network and the host material, wherein the surface is connected to at least a portion of the polymeric network via a non-covalent bond, and wherein application of a source of energy to the device causes switching in a liquid crystal display.

DETAILED DESCRIPTION

Figure 1:
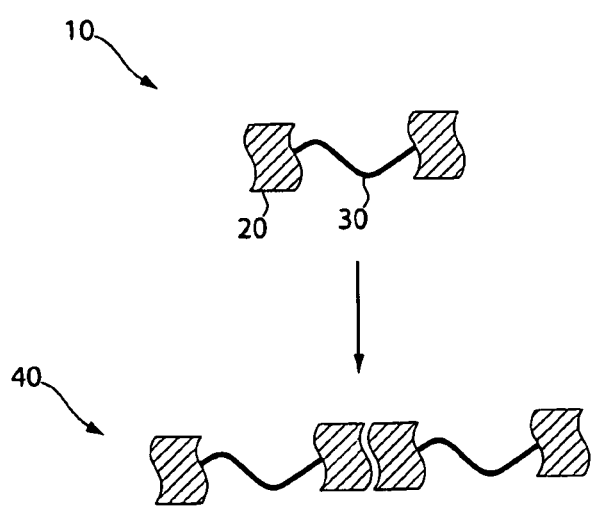
FIG. 1 shows a schematic representation of the formation of a polymeric network from a plurality of polymer molecules.

The present invention generally relates to composition, devices, and methods involving the alignment of materials, including polymers.

In some embodiments, the present invention provides compositions and devices comprising the assembly of molecules via intermolecular interactions to produce extended networks. In some cases, the extended networks may have enhanced properties relative to the individual molecules. For example, embodiments of the present invention may comprise the assembly of polymer molecules via interchain interactions (e.g., hydrogen bonds) to produce chain-extended polymeric networks, wherein the polymer network may exhibit enhanced alignment properties, optical properties, transport properties, or the like, when compared to an essentially identical, individual polymer. Such polymeric networks may be advantageous for use in electronics, photovoltaics, sensor applications, and the like. In some embodiments, the present invention may enhance the performance of certain optical devices, such as liquid crystal displays (e.g., color liquid crystal displays) by providing enhanced contrast ratio, faster response times, and/or lower operating voltage.

In some embodiments, the present invention may advantageously facilitate alignment of polymers. In some cases, the alignment may be intermolecular alignment, wherein a plurality of polymers may be assembled via functional groups positioned at or near a terminal end of the polymer and capable of interacting with an adjacent polymer. This may result in the formation of chain-extended polymer networks exhibiting high order parameters (e.g., high dichroic ratio), which may be determined from the polarized absorption of the polymeric network. In some cases, the alignment may be intramolecular alignment, wherein increased alignment may occur within an individual polymer chain. For example, a conjugated polymer molecule may, upon formation of a chain-extended polymer network and/or when combined with a host material, adopt a more planar conformation, which may produce improved charge transport properties.

Some embodiments of the present invention may also be useful as stabilizing elements or "molecular cytoskeletons" in the alignment of materials. For example, when combined with materials such as liquid crystals, polymeric networks as described herein may stabilize and/or accelerate the alignment of one or more liquid crystal phases. That is, the polymeric networks may serve as a structural reinforcing group to stabilize, for example, liquid crystals in a desired orientation, tilt angle, or mesophase, in some cases, without need for an external source of energy. This may be useful in the fabrication of bistable devices, such as electronic paper, which may require materials to maintain a particular orientation in the absence of an external energy source. Another advantage of the present invention may be the ability to accelerate and/or enhance the switching events in devices, such as liquid crystal devices. For example, many liquid crystal devices involve the heterogeneous alignment of a liquid crystal, wherein, in the absence of an external source of energy, the alignment of a liquid crystal sample in a particular orientation may begin at the interface between the liquid crystal and at least one surface (e.g., rubbed or treated surface), wherein the surface interacts with (e.g., orients) the liquid crystal at the surface, followed by propagation of the alignment through the bulk of the sample. In some cases, heterogeneous alignment may occur on a timescale that may be slow, relative to the desired rate of switching. In contrast, polymeric networks of the invention may be present throughout the bulk of the material and may facilitate homogeneous alignment of a liquid crystal, i.e., from a first orientation to a second orientation, which may occur more rapidly than heterogeneous alignment. Thus, devices of the invention may switch between different liquid crystal states with greater speed and uniformity, resulting in devices having faster response times and enhanced performance.

In some embodiments, the present invention provides compositions comprising polymeric networks comprising the assembly of a plurality of polymer molecules, wherein each polymer molecule comprises at least one intermolecular interacting group at or near a terminal end of the polymer molecule. The polymer molecules may be connected to an adjacent polymer molecule via the interacting group, wherein the interacting group forms a bond with an adjacent polymer. The bond may be non-covalent bond or a covalent bond. In some cases, the bond is a non-covalent bond such as a hydrogen bond, ionic bond, dative bond, or Van der Waals interaction. In some embodiments, the polymer molecules may be connected to an adjacent polymer molecule via a hydrogen bond. In some embodiments, the polymer molecules may be connected to an adjacent polymer molecule via a covalent bond. The polymer molecules may assemble via the interacting groups to form a polymeric network having a greater chain length than an individual polymer molecule. In some case, at least a portion of the polymer molecules may be connected to (e.g., form a bond with) one or more surfaces in contact with the composition via an interacting group.

Figure 2:
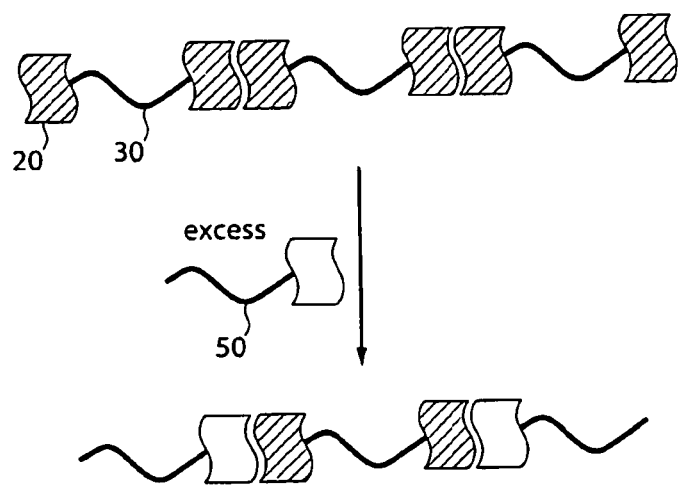
FIG. 2 shows a schematic representation of the disruption of a polymeric network by adding an excess of a species containing a single interacting group.

As shown schematically in FIG. 1, polymer molecule 10 may comprise interacting groups 20 attached to the terminal ends of polymer 20. Polymer molecule 10 may then form a bond, such as a hydrogen-bond, for example, with an adjacent polymer molecule to form polymeric network 40. The polymer molecule may comprise interacting groups positioned at or near both terminal ends of the polymer molecule, allowing formation of a polymeric network that may extend throughout the bulk of a given volume and may have essentially infinite length within the volume. In some embodiments, at least 50% of the polymer molecules are connected to an adjacent polymer molecule via the at least one interacting group. In other embodiments, at least 60%, at least 70%, at least 80%, or, at least 90% of the polymer molecules are connected to an adjacent polymer molecule via the at least one interacting group. In some cases, formation of the polymeric network may be reversible. As shown schematically in FIG. 2, addition of an excess of a species 50 comprising a single interacting group may disrupt the polymeric network, wherein the individual polymer molecules interact with the species 50 rather than with an adjacent polymer molecule.

The polymeric network comprising the assembly of a plurality of polymer molecules may advantageously have a greater dichroic ratio than a dichroic ratio of an individual polymer molecule that is essentially identical to an individual polymer molecule of the polymeric network, but lacking the interacting group, under essentially identical conditions. As used herein, the term "dichroic ratio" is given its ordinary meaning in the art and refers to the ratio of the polarized absorption of a species along two different axes of the species. The dichroic ratio may be defined by the formula, $$DR=(A_\parallel-A_\perp)/(A_\parallel+A_\perp),$$

wherein $A_\parallel$ is the absorption measured along a direction that is parallel to an expected alignment of a species, while $A_\perp$ is the polarized absorption along a direction that is perpendicular to the expected alignment of the species. In some cases, $A_\parallel$ refers to the alignment of a species along the long axis of the species. The dichroic ratio of a material generally indicates the extent to which the material may be aligned along a particular direction, wherein a large dichroic ratio may indicate a high degree of alignment. In some embodiments, the dichroic ratio of the polymeric network is at least 10%, at least 20%, at least 30% at least 40%, at least 50%, at least 60%, or, at least 70% greater than the dichroic ratio of a polymer molecule that is essentially identical to an individual polymer molecule of the polymer network, but lacking the interacting group, under essentially identical conditions. In some cases, the dichroic ratio may be increased by 80%, 90%, or even greater.

As used herein, a first species may be exposed to a set of "essentially identical conditions" as a second species by subjecting the first species and second species to a similar or substantially identical set of environmental parameters, such as temperature, pressure, pH, solvent, concentration, chemical reagent, atmosphere (e.g., nitrogen, argon, oxygen, etc.), electric field, electromagnetic radiation, other source of external energy, or the like, for a similar or identical period of time.

In some cases, compositions of the invention may further comprise a host material with which the polymeric network is mixed. For example, the host material may be a solvent, polymer, gel, liquid crystal, other materials capable of forming anisotropic phases, or materials that are miscible with the polymeric network. In some embodiments, the host material comprises a liquid crystal. In some cases, the polymeric network may be molecularly dissolved in the host material. As used herein, a "molecularly dissolved" polymeric network refers to a polymeric network that may be soluble within (e.g., does not phase-separate from) a host material while remaining an intact, polymeric network. That is, while the polymer network may be soluble within the host material at the molecular level, there may be little or no disruption in the assembly of the individual polymer molecules. In some cases, upon switching of the host material and polymer network between different orientations, the polymer network may remain intact. In some cases, upon switching of the host material and polymer network between different orientations, the polymer network may undergo slight disruption but may then rapidly re-assemble such that the alignment of the host material is essentially unaffected by the slight disruption. Compositions comprising polymeric network mixed with and/or molecularly dissolved in host materials may have use in a wide variety of applications, as described more fully below.

The present invention also provides methods for increasing the dichroic ratio of a polymer molecule. In some cases, the formation of a polymeric network as described herein may increase the dichroic ratio of a polymer molecule. For example, the method may comprise providing a host material and a plurality of polymer molecules with which the host material is mixed, wherein each polymer molecule comprises at least one intermolecular interacting group attached at or near a terminal end of the polymer molecule. The at least one interacting group(s) may then be allowed to interact with an adjacent polymer molecule, i.e., via an interacting group of the adjacent polymer molecule, to form a polymeric network. The interaction between adjacent polymer molecule may comprise the formation of a bond, as described herein. In some cases, the formation of the extended polymer network may cause an individual polymer molecule to adopt a chain-extended confirmation which may be aligned with the host material, thereby increasing the dichroic ratio of the polymer molecule. For example, the host material may be a liquid crystal, wherein the liquid crystal and the polymeric network are oriented such that the polymer backbones of the individual polymer molecules may be oriented non-perpendicular or essentially parallel to the liquid crystal director.

In some cases, formation of the extended polymer network may cause an individual polymer molecule to adopt a planar conformation along the polymer backbone. For example, conjugated polymer molecules comprising interacting groups may assemble to form polymeric networks as described herein, which may result in increased conjugation lengths along the polymer backbone and enhanced optical properties (e.g., luminescence emission). In some cases, the polymer may comprise a shape-persistent molecule which may facilitate alignment in and/or compatibility with the host material.

Figure 3A:
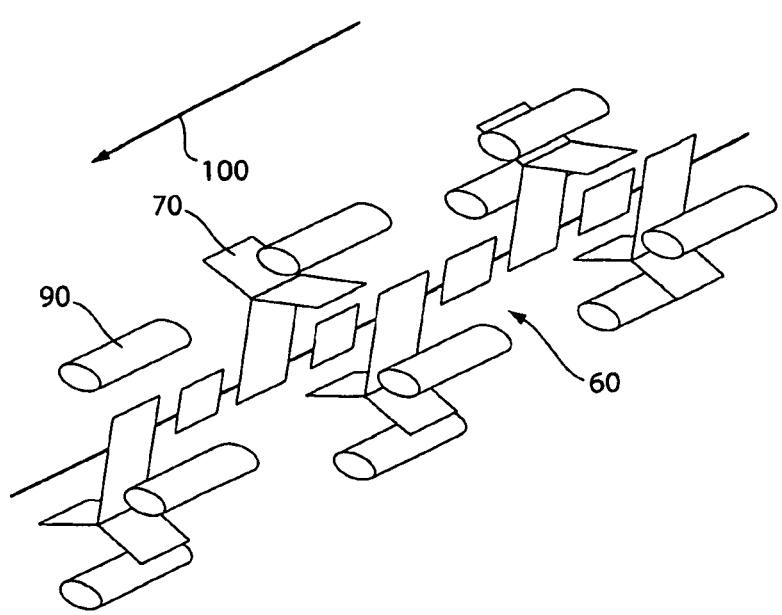
FIG. 3A shows a schematic representation of the alignment of a nematic liquid crystal host material by a polymeric network.
Figure 3B:
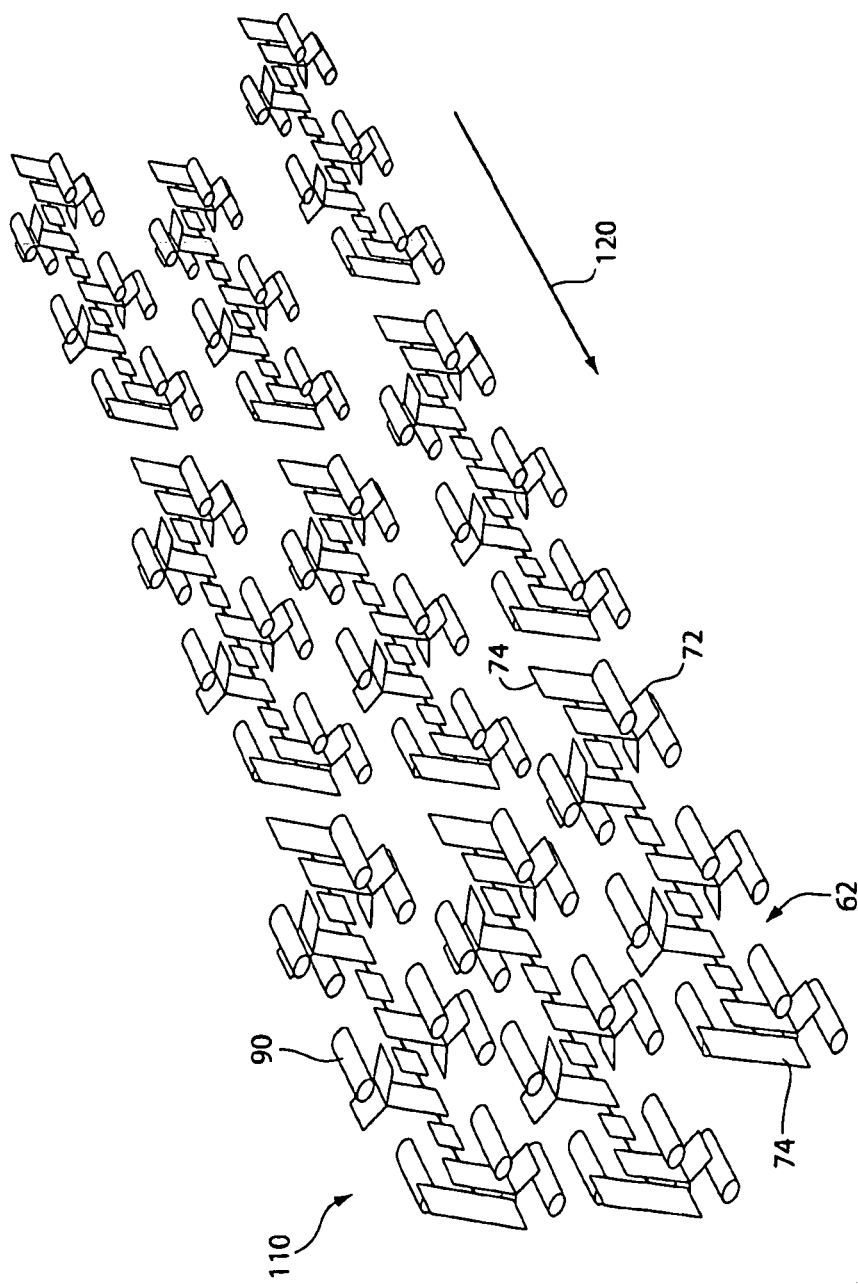
FIG. 3B shows a schematic representation of a polymer comprising a shape-persistent group combined with a nematic liquid crystal host material.

The interaction between individual polymer molecules may increase the dichroic ratio of the polymer molecules, since the polymeric network may have a greater dichroic ratio than the dichroic ratio of a polymer molecule that is essentially identical, but lacking the interacting group, under essentially identical conditions. The presence of polymeric networks as described herein may also influence (e.g., increase) the alignment of the host material. For example, as shown in FIG. 3A, a polymer molecule 60 comprising a shape-persistent moiety 70, when mixed with a liquid crystal material 90, may adopt an extended structure wherein the polymer backbone aligns in the direction 100 of the liquid crystal director. However, as shown in FIG. 3B, a polymeric network 110 may be formed by the assembly of individual polymer molecules 62, each comprising a shape-persistent moiety 72 and interacting groups 74 positioned at or near the terminal ends of a polymer molecule 62. Each polymer molecule 62 may adopt an extended structure such that, when mixed with the liquid crystal material 90, the polymeric network aligns in the direction 100 of the liquid crystal director. In some embodiments, polymeric network 110 may have a greater dichroic ratio than the dichroic ratio of polymer molecule 60 under essentially identical conditions, wherein polymer 60 is essentially identical to the individual polymer molecules 62 of polymeric network 110, except that polymer 60 lacks interacting group. That is, the interaction between adjacent polymer molecules to form an extended polymeric network may increase the dichroic ratio of the polymer molecules.

The present invention also relates to devices wherein increased alignment (e.g., increased dichroic ratio) may improve the performance of the devices. Devices of the invention may comprise polymeric networks as described herein, alone or in combination with a host material, to facilitate alignment of at least one component of the device, such as a liquid crystalline component. For example, the device may comprise a polymeric network and a host material with which the polymeric network is mixed, wherein the polymeric network is capable of orienting the host material. In some cases, the host material comprises a liquid crystal material, and the polymeric network may serve as a directing element or "molecular cytoskeleton" for facilitating alignment of the individual liquid crystalline species. That is, the liquid crystal and the polymeric network may be aligned in the same orientation, wherein the polymer backbones of the individual polymer molecules are oriented non-perpendicular or essentially parallel to the liquid crystal director. The polymeric network may increase, stabilize, accelerate, or otherwise improve the alignment of the host material. In some cases, the polymeric network may allow the host material to adopt a particular orientation that may not be stable in the absence of the polymeric network. For example, the polymeric network may stabilize the host material in an orientation having relatively high energy.

In the illustrative embodiment shown in FIG. 3B, polymeric network 110 may have an axis 120 along the assembly of the plurality of polymer molecules, i.e., along the long axes of the polymer molecules 62, and the host material may comprise a plurality of liquid crystalline species 90, each having a primary axis aligned so as to together define an average axis of the liquid crystalline species primary axes (e.g., the liquid crystal director). The polymeric network 110 may interact with the host material 90 to direct the individual liquid crystalline species to align non-perpendicular or essentially parallel to the axis 120 of the polymeric network.

The devices may comprise additional components capable of orienting the host material in one or more orientations. In some cases, the device may comprise at least one surface in contact with at least a portion of the host material, wherein the surface is capable of orienting the host material. The surface may be a rubbed surface, wherein the host material may align along grooves formed by the rubbing direction. In some embodiments, an inorganic material (e.g., silicon oxide, and the like) may be evaporated onto a surface such that the treated surface may then align a host material. In some cases, one or more surfaces may contact the host material at different locations. For example, a liquid crystal may be placed between a first rubbed surface having a rubbing direction and a second rubbed surface having a rubbing direction, wherein the surfaces are arranged such that the rubbing directions of the two surfaces are positioned non-parallel or essentially perpendicular (e.g., approximately 90°) with respect to one another. This may result in the formation of a twisted nematic phase, wherein the liquid crystal director rotates approximately 90° from the first rubbed surface to the second rubbed surface. Examples of surfaces that may be used as alignment layers for liquid crystals include polymer surfaces, including polyimide, and the like. Other examples of surfaces that may align host materials are described in, for example, *Thermotropic Liquid Crystals*, G. W. Gray, Ed., John Wiley & Sons, 1987, and a review by J. Cognard, Mol. Cryst. Liq. Cryst. 78, Supplement 1 (1981), pages 1-77.

In some cases, the device may comprise at least one surface in contact with a portion of the host material and/or polymer molecules, wherein the surface may facilitate formation of the polymer network and/or is capable of orienting the polymer molecules. For example, the surface may be functionalized with one or more interacting groups capable of forming a bond with interacting groups of the polymer molecules. The functionalized surface may facilitate formation and/or alignment of the polymer network. For example, the device may comprise a surface in contact with the polymeric network, wherein the surface is connected to at least a portion of the polymeric network via, for example, a bond such as a non-covalent bond (e.g., a hydrogen bond).

In some cases, the devices may comprise more than one polymeric network. For example, the device may comprise a first polymeric network and a second polymeric network, both mixed with the host material, wherein the first polymeric network is capable of orienting the host material in one orientation and the second polymeric network is capable of orienting the host material in a different orientation.

Devices of the invention may further comprise electrodes, polarizing filters, sources of external energy, and the like, in combination with the components described herein.

In some embodiments, the present invention advantageously provides devices and methods for orienting a host material. In some cases, the device may be capable of rapidly orienting and/or re-orienting a host material such that the device has an accelerated response time. As used herein, the "response time" of a device may be measured by the amount of time required to reorient or switch the host material between two orientations. For example, the response time may relate to the amount of time it takes to switch the "on" and "off" states of a liquid crystal device. Devices having faster response times may generally have improved performance. For example, in some cases, display devices with rapid response times may exhibit fewer visible image artifacts.

Accordingly, in some embodiments, methods of the invention may comprise providing a device comprising a polymeric network and a host material with which the polymeric network is mixed, wherein the host material has a first orientation. Exposure of the device to a source of external energy may cause at least some of the host material to move from the first orientation to a second orientation, wherein the second orientation is different than the first orientation. Subsequent removal of the source of external energy may then cause the host material moved from the first to the second orientation to move or relax from the second orientation to the first orientation, wherein the host material moves from the second orientation to the first orientation more rapidly than in a device that is essentially identical, but lacks the polymeric network, under essentially identical conditions. That is, the presence of the polymeric network may accelerate reorganization of the host material from the second orientation to the first orientation by serving as a directing or aligning element positioned throughout the bulk of the host material, resulting in faster switching speeds and improved device performance. In some cases, the polymer molecules or polymeric network may be reoriented with the host material, i.e., both the polymer molecules and the host material may be moved from a first orientation to a second orientation. In some cases, the polymer molecules or polymeric network may remain in essentially the same orientation, while the host material may be moved from a first orientation to a second orientation. Methods described herein may be advantageous over devices which lack the polymeric network, such as, for example, devices where realignment of the host material often depends on interaction of the host material with a rubbed or otherwise treated surface, followed by propagation of the alignment into the bulk of the host material, which can limit the response time.

For example, a device may comprise a polymeric network and a host material with which the polymeric network is mixed, wherein the polymeric networks stabilizes the host material in an initial orientation, and the host material is switched from an initial orientation to a different orientation upon application of an external source of energy (e.g., electric field). Upon removal of the external source of energy, the host material may rapidly return to and maintain its initial orientation due to the presence of the polymeric network, i.e., the polymeric network may provide a "memory" of the initial orientation.

Figure 12A:
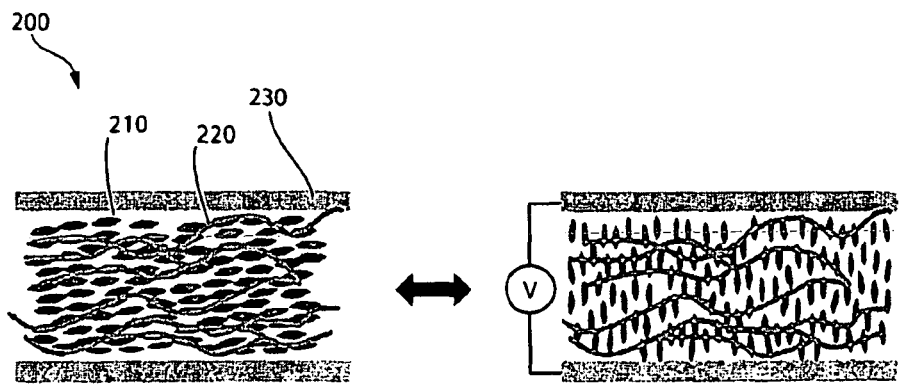
FIG. 12A shows a schematic representation of a planar-aligned liquid crystal device incorporating polymers comprising hydrogen-bonding endgroups.

In an illustrative embodiment shown in FIG. 12A, device 200 may comprise a polymeric network 220 as described herein mixed with a nematic liquid crystal host material 210, wherein the polymeric network 220 and liquid crystal 210 are oriented in a direction that is non-perpendicular or essentially parallel to surface 230 in contact with the polymeric network/liquid crystal mixture. Polymeric network 220 may stabilize liquid crystal 210 in this initial orientation. Upon application of an electric field, the liquid crystal molecules may be moved from its initial orientation to an orientation that is non-parallel or essentially perpendicular to surface 230, i.e., the liquid crystal molecules are moved approximately 90° relative to their original orientation. In some cases, the liquid crystal molecules may be moved less than 90° relative to their original orientation. Upon removal of the electric field, the liquid crystal molecules may relax or decay to their original orientation (e.g., approximately parallel to surface 230) more rapidly than in an essentially identical device lacking the polymeric network, under essentially identical conditions. That is, the polymeric network or molecular cytoskeleton may cause the liquid crystal molecules to quickly "snap back" to their original equilibrium state. The presence of the polymeric network may improve the ability to reorient liquid crystal host material as the liquid crystal molecules may be reoriented uniformly through the device, producing faster optical responses. In some cases, surface 230 may also be a rubbed or otherwise treated surface, to further facilitate realignment of the liquid crystal molecules.

Figure 12B:
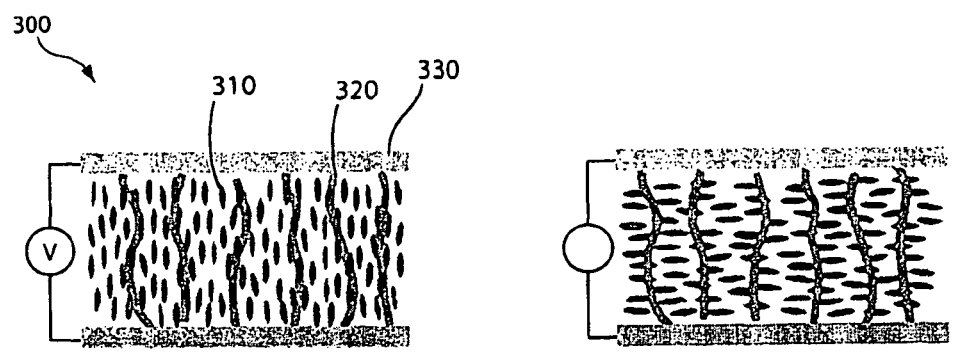
FIG. 12B shows a schematic representation of a homeotropically-aligned liquid crystal device incorporating polymers comprising hydrogen-bonding endgroups.

In one set of embodiments, the polymer network may stabilize a liquid crystal in a homeotropic orientation (e.g., an orientation non-parallel or essentially perpendicular to the surface). For example, a nematic liquid crystal 310 may be homeotropically aligned such that an initial liquid crystal director (e.g., the initial average axis of liquid crystal molecule primary axes) is oriented essentially perpendicular to surface 330 in contact with liquid crystal 310, as shown in FIG. 12B. Application of an electric field may rotate or tilt the liquid crystal director such that the liquid crystal molecules are moved to an orientation that is not essentially perpendicular to the surface. Removal of the electric field may then cause the liquid crystal molecules to rapidly return to their initial orientation, i.e., the liquid crystal director returns to its initial homeotropic orientation, where the liquid crystal molecules 210 are stabilized by polymeric network 320. In some embodiments, the liquid crystal molecules may have a dipole that is perpendicular to the long axis of the liquid crystal molecule. The polymeric network may, in some cases, be connected to one or more surfaces. Such devices may be useful in, for example, liquid crystal display applications, wherein rapid switching may enhance device performance.

Another advantage of the present invention may be the ability to provide methods and devices comprising a polymeric network and host material as described herein, wherein the host material (e.g., liquid crystal) is capable of substantially maintaining more than one orientation (e.g., liquid crystal phase, tilt angle, other orientation, etc.) in the absence of an external source of energy. For example, methods of the invention may comprise providing a device comprising a polymeric network and a host material with which the polymeric network is mixed, wherein the host material has a first orientation, and exposing the device to a first source of energy to cause at least some of the host material to move from the first orientation to a second orientation. Upon removal of the source of energy, the host material that was moved from the first to the second orientation may remain substantially in the second orientation for a period of time. Subsequent exposure of the device to a second source of energy may then cause the host material moved from the first to the second orientation to return to the first orientation. In some cases, the polymeric network may orient and/or maintain the host material in the second orientation for a longer period of time than, for example, in a device that is essentially identical, but lacks the polymeric network, under essentially identical conditions.

In some cases, the device may require application of a source of external energy in order to switch the host material from one orientation to another, but the source of external energy may not be required substantially retain the host material in an orientation for a period of time. In some cases, the host material may substantially retain a higher energy state (e.g., orientation) in the absence of a source of external energy. That is, the host material may be oriented to a relatively high energy state upon exposure to a source of energy, and, upon removal of the source of energy, the host material may slightly relax or decay from the high energy state, but may substantially retain the orientation of the high energy state. For example, a liquid crystal host material may have a first orientation in a low energy state. Upon exposure to an electric field, the liquid crystal may be oriented by the electric field and may adopt a second orientation in a relatively high energy state. When the electric field is removed, the liquid crystal may undergo slight decay or relaxation to a metastable state, which may be stabilized by the presence of a polymeric network, wherein the liquid crystal substantially retains the orientation of the relatively high energy state (e.g., the second orientation). The liquid crystal may then be triggered, upon exposure to an electric field, to relax to the low energy, first orientation. As described herein, the device may comprise additional components that may aid in the stabilization of a particular host material and/or polymeric network orientation. For example, the devices may comprise a surface in contact with at least a portion of the host material and/or polymeric network, wherein the surface is capable of orienting the host material and/or polymeric network. For example, the surface may be treated/rubbed, and/or may be functionalized with interacting groups. In some embodiments, the devices may comprise more than one polymeric network, wherein each polymeric network is capable of orienting the host material in a different orientation.

In an illustrative embodiment, a polymeric network as described herein may be mixed with a nematic liquid crystal host material, wherein the polymeric network and liquid crystal are oriented in a direction that is non-perpendicular or essentially parallel to, for example, the grooves of a rubbed surface in contact with the polymeric network/liquid crystal mixture. Upon application of an electric field, the polymeric network/liquid crystal mixture maybe oriented in a direction that is non-parallel or essentially perpendicular to the rubbed surface, i.e., the liquid crystal molecules and polymeric network are moved 90° relative to their original orientation, which may be a relatively higher energy orientation relative to the original orientation. Upon removal of the electric field, the liquid crystal/polymeric network may relax or decay to an orientation where the liquid crystal/polymeric network may be positioned less than 90° relative to the original orientation but substantially retains the orientation of the relatively high energy state.

In an illustrative embodiment shown in FIG. 12B, device 300 may comprise a polymeric network 320 as described herein mixed with a nematic liquid crystal host material 310. The polymeric network/liquid crystal mixture may be in contact with surface 330, which may be, for example, a treated or rubbed surface capable of facilitating alignment of the liquid crystal molecules in an orientation that is non-perpendicular or essentially parallel to surface 330. Surface 330 may also be functionalized with interacting groups, such that polymeric network 320 is attached to and/or oriented non-parallel or essentially perpendicular to surface 330. Polymeric network 320 may be capable of orienting the liquid crystal molecules in an orientation that is non-parallel or essentially perpendicular to surface 330. In some embodiments, the liquid crystal molecules may be oriented in a orientation that is non-perpendicular or essentially parallel to surface 330, Application of, for example, a pulse of an electric field, may orient the liquid crystal molecules in a direction that is non-parallel or essentially perpendicular to surface 330. Upon removal of the electric field, the liquid crystal may undergo slight decay or relaxation to a metastable state, which may be stabilized by the presence of a polymeric network, wherein the liquid crystal essentially maintains an orientation that is non-parallel or essentially perpendicular to surface 330. The liquid crystal may then be triggered, upon exposure to a pulse of an electric field, to be moved to its original orientation non-perpendicular or essentially parallel to surface 330, wherein the presence of a, for example, rubbed or treated surface may enhance the response time of the liquid crystal and/or may stabilize the liquid crystal phase in its original orientation. In some embodiments, the device may be a bistable device, such as a bistable liquid crystal device. As used herein, a "bistable liquid crystal" refers to a liquid crystal which can substantially maintain two different orientations (e.g., liquid crystal orientations) for an amount of time without need for an external source of energy to stabilize the orientations. In some cases, the amount of time may be longer than in devices which lack polymeric networks as described herein.

Devices and methods of the present invention may be used in a wide variety of applications. For example, the device may be constructed and arranged to display a particular type of behavior upon application of a source of energy to the device, removal of a source of energy from the device, and/or orientation/reorientation of the host material, including a change in color, a change in luminescence, a change in transmission of an optical signal (e.g., hologram, diffraction pattern, reflection pattern, or the like), or other signal recognizable by a human. In some cases, application of a source of energy to the device causes switching in a liquid crystal display.

The present invention also relates to polymer compositions comprising a polymer having a substantially rigid polymer backbone and at least one intermolecular interacting group attached at or near a terminal end of the polymer, as described herein. As used herein, a "substantially rigid" polymer backbone refers to a polymer backbone having sufficient rigidity such that it may adopt a chain-extended structure within a host material, such as a liquid crystal. In some cases, at least a portion of the polymer backbone is rigid. In some cases, the polymer backbone is rigid along the essentially the entire length of the polymer backbone. As used herein, a "rigid" portion of a polymer backbone refers to a portion wherein the spatial relationship (e.g., angle, distance, etc.) between adjacent monomeric moieties cannot change, outside of normal molecule-scale changes in temperature, etc., without breaking at least one bond. For example, a portion of a polymer including $sp^3$-hybridized carbon atoms may not be rigid (e.g., alkyl chains, heteroalkyl chains, and the like), while $sp^2$-hybridized or sp-hybridized carbon atoms may impart a higher degree of rigidity (e.g., aryl groups, alkynyl groups). However, portions of a polymer including $sp^3$-hybridized carbon atoms, wherein the $sp^3$-hybridized carbon atoms, for example, form bridgeheads between fused rings in a bicyclic or polycyclic structure or otherwise form a shape-persistent moiety may be considered to form a rigid structure. In some embodiments, a polymer or portion thereof may comprise a metal atom, wherein the metal atom, when bound to or otherwise attached to the polymer, imparts a degree of rigidity to the polymer.

In some cases, the polymer may include rigid portions and one or more non-rigid portions, so long as the combination of rigid and non-rigid portions allows the polymer to adopt a chain-extended structure within a host material. In some cases, adjacent monomeric units which are joined by a single bond may rotate around the single bond, but may be considered rigid with respect to one another within the polymer backbone. In some cases, the spatial relationship between pendant side groups on adjacent monomers, or between a pendant side group of one monomer and an adjacent monomer, may change but the polymer backbone may be considered rigid. In some embodiments, the polymer may have a substantially rigid polymer backbone and pendant side groups which may or may not be rigid.

In some cases, the polymer may be a conjugated polymer (e.g., pi-conjugated, sigma-conjugated, or the like), such as a poly(arylene), poly(arylenevinylene), poly(arylene-ethynylene), or a substituted derivative thereof. In a particular embodiment, the polymer may be poly(aryleneethynylene). In some cases, the polymer may comprise portions which are not conjugated, but may be rigid, such as fused, bicyclic and fused, polycyclic structures. For example, a polymer backbone may comprise an iptycene moieties, wherein adjacent monomeric units are attached via the bridgehead atoms of the iptycene moiety.

Polymers of the invention may also comprise shape-persistent molecules. As used herein, a "shape-persistent" molecule refers to a molecule or portion of a molecule having a significantly rigid structure, wherein no portion of the shape-persistent molecule having a combined molecular weight of at least 15 g/mol may move relative to other portions of the shape-persistent molecule moiety having a molecular weight of greater than 25, 50, or 100 g/mol can move relative to other portions of the shape-persistent molecule via rotation about a single bond. Rigid structures may be provided, for example, by aromatic structures, polycyclic structures including non-planar polycyclic structures, and the like. Examples of shape-persistent molecules include polycyclic aromatic groups (e.g., naphthalene, anthracene, etc.), bridged polycyclic structures (e.g., iptycenes, norbornanes, adamantanes, etc.), ladder polymers, and the like. In some cases, the shape-persistent molecule may be located within the polymer backbone. In some cases, the shape-persistent molecule may be located within a group that is pendant to the polymer backbone.

In some cases, the shape-persistent molecule may advantageously facilitate alignment of species within a host material or may facilitate alignment of the host material itself. For example, a shape-persistent molecule may be covalently attached to a species and, when combined with a host material, may facilitate alignment of the species within the host material. In some embodiments, the shape-persistent molecule may have a three-dimensional structure having a sufficient degree of free volume to create void spaces. When mixed with a host material such as a liquid crystal, for example, the host material may fill in the void spaces. Other species, including small molecules, macromolecules, polymers, etc., may also occupy the void spaces. In some cases, the shape-persistent molecule may advantageously have minimal affect on the alignment of the host material, i.e., does not change the director of the host liquid crystal. In some cases, such as, for example, when the shape-persistent molecule is included in an extended polymeric network as described herein, the shape-persistent molecule may facilitate alignment of the host material in a particular orientation.

Figure 5A:
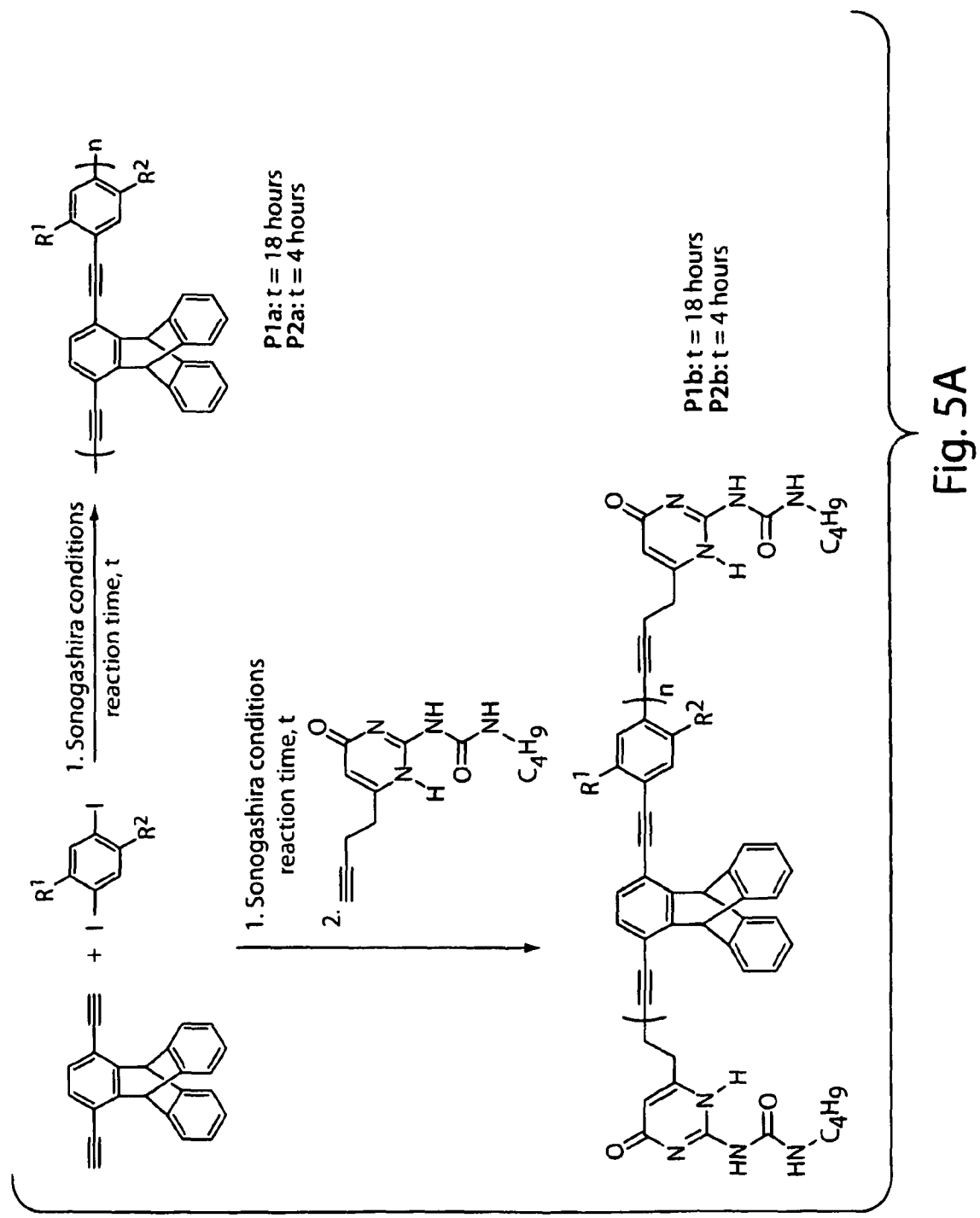
FIG. 5A shows the synthesis of poly(phenylene ethynylene) comprising ureidopyrimidinone endgroups, according to one embodiment of the invention.
Figure 5B:
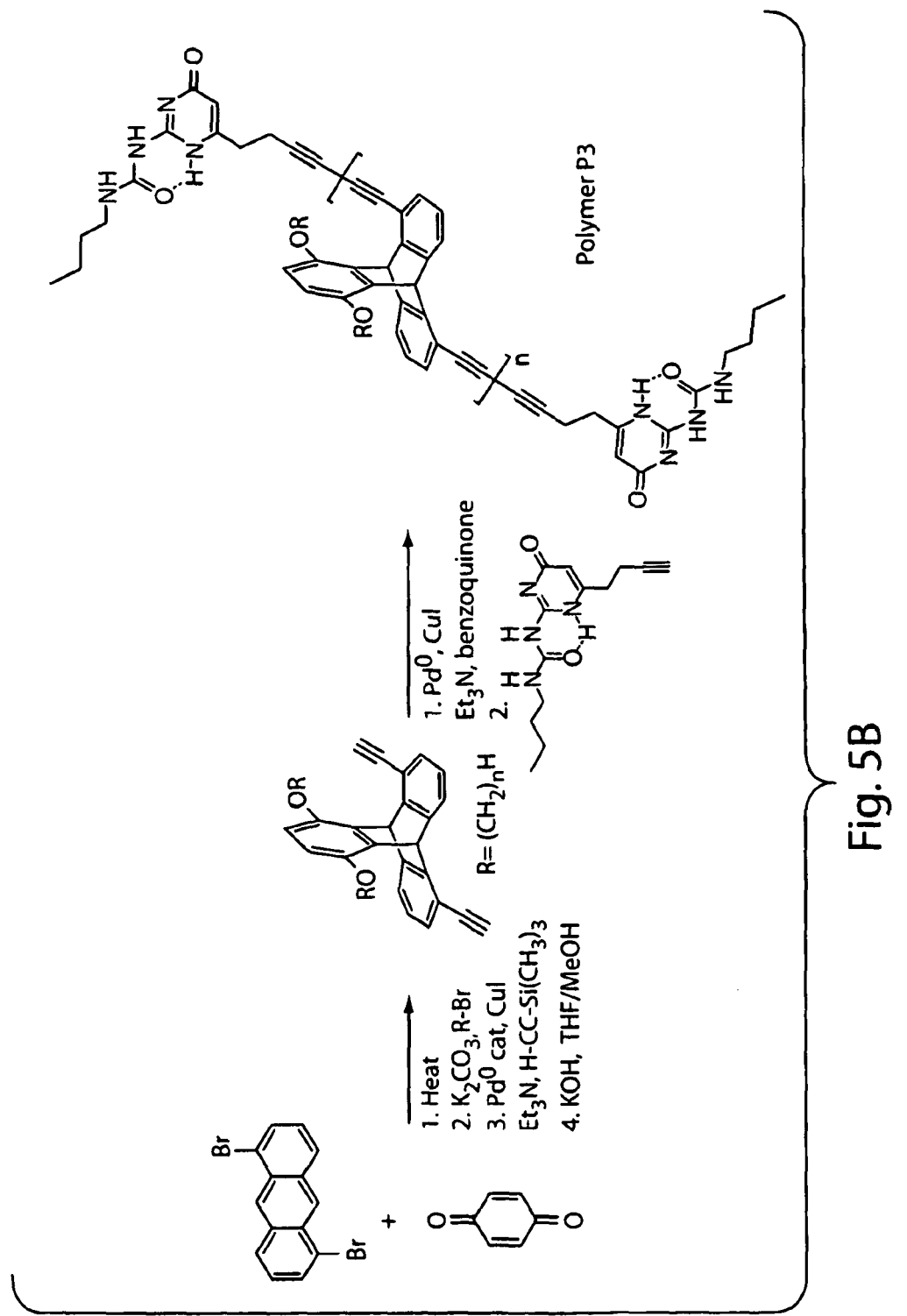
FIG. 5B shows the synthesis of a poly(phenylene ethynylene) comprising ureidopyrimidinone endgroups, according to another embodiment of the invention.

FIGS. 5A-B show examples of polymers comprising shape-persistent molecules and intermolecular interacting groups attached at or near a terminal end of the polymer, as well as the syntheses of such polymers.

In some embodiments, the polymer molecule may be appropriately functionalized to impart desired characteristics (e.g., surface properties) to the polymer. For example, the polymer may be functionalized or derivatized to include compounds, functional groups, atoms, or other species that can alter or improve properties of the polymer. In some embodiments, the polymer may include compounds, atoms, or materials that can alter or improve properties such as compatibility (e.g., solubility, stability) with a host material. In some cases, the polymer may comprise functional groups selected to possess an affinity for a surface. Other properties of the polymers may be tailored based on substitution of the polymer backbone, such as a particular band gap or a specific emission wavelength or color emission. For example, a conjugated polymer may be substituted with electron-poor groups, such as acyl, carboxyl, cyano, nitro, sulfonate, or the like, or the polymer may install electron-poor aryl groups in the backbone of the conjugated polymer, such that the conjugated polymer exhibits an emission (e.g., luminescence emission, color emission) at shorter wavelengths. In other embodiments, the conjugated polymer may be substituted with electron-rich groups, such as amino, hydroxy, alkoxy, acylamino, acyloxy, alkyl, halide, and the like, or the monomers may install electron-rich aryl groups in the backbone of the conjugated polymer, such that the conjugated polymer exhibits emission at longer wavelengths. In some embodiments, the polymer may tailored to advantageously have a large Stokes shift, wherein the fluorescence spectrum is observed at a substantially longer wavelength than the excitation spectrum.

In some embodiments, the polymer may have the structure,

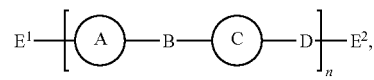

wherein n is at least 1, A and C are optionally substituted aromatic groups; B and D are absent, alkene, alkyne, heteroalkene, or heteroalkyne; and $E^1$ and $E^2$ can the be the same or different and are interacting groups. In some cases, $E^1$ and $E^2$ are groups capable of forming hydrogen bonds with an adjacent polymer molecule. In some cases, A and/or C may comprise a shape-persistent moiety, such as an iptycene or triptycene moiety.

In some cases, the polymer molecule may comprise a group having the following structure,

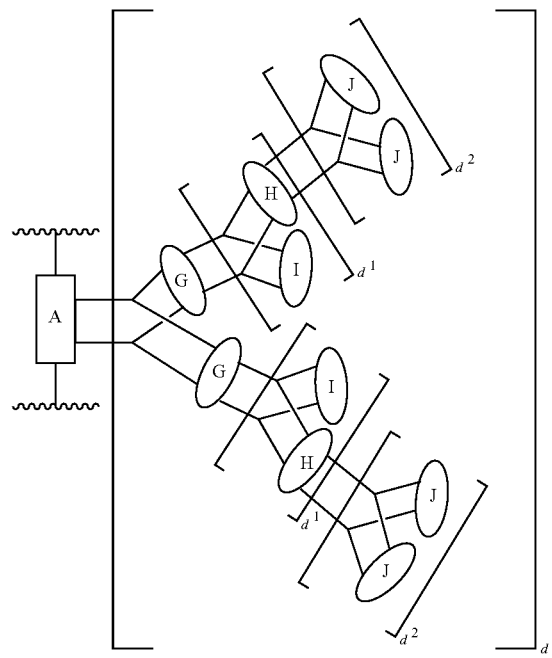

wherein G, H, I, and J are aromatic groups, d=1, 2, and $d^1$=0, 1, such that when $d^1$=0, $d^2$=0 and when $d^1$=1, $d^2$=0, 1. In some embodiments, G and H can be the same or different and are:

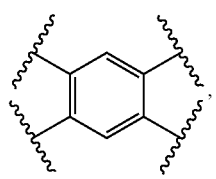

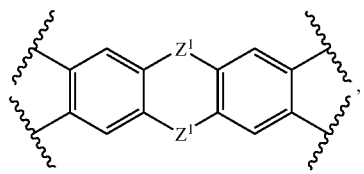

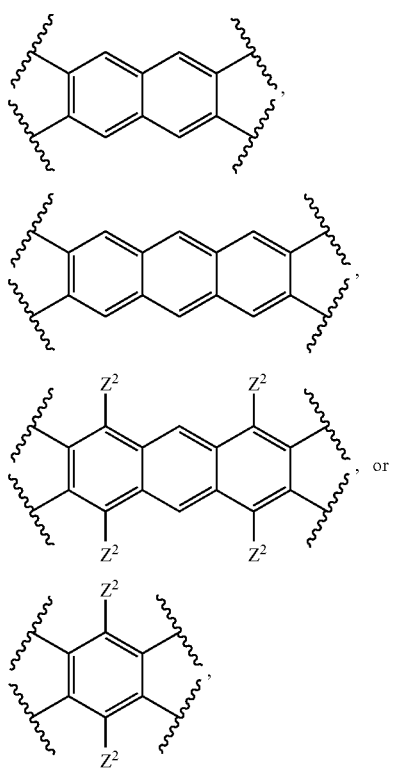

optionally substituted, I and J may be the same or different and are:

optionally substituted, wherein each $Z^1$ can be the same or different and $Z^1$ is O, S or NR, wherein R is hydrogen, alkyl, heteroalkyl, aryl, or heteroaryl, optionally substituted, and each $Z^2$ can be the same or different and $Z^2$ is halide, alkyl, heteroalkyl, aryl, or heteroaryl, optionally substituted. In some cases, the polymer molecule comprises a group having the following structure, optionally substituted.

For example, the polymer may have the structure,

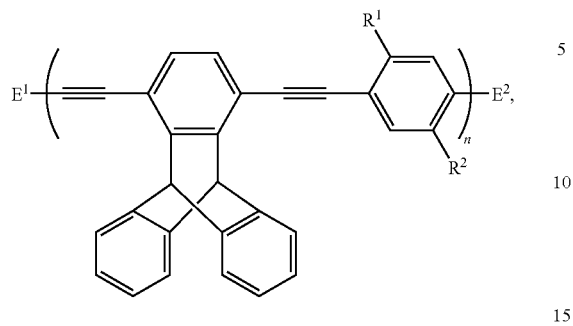

wherein $R^1$ and $R^2$ can be the same or different and are alkyl, heteroalkyl, aryl, heteroaryl, or substituted derivatives thereof.

In a particular embodiment, the polymer has the structure,

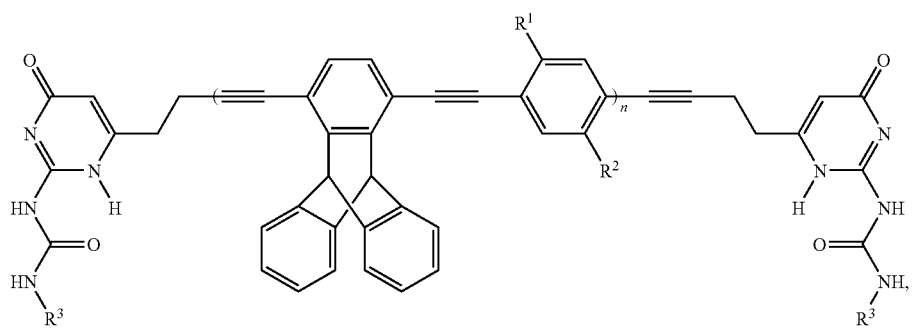

wherein $R^1$ and $R^2$ are 2-ethylhexyl, and $R^3$ is butyl.

In some embodiments, the polymer may have the structure,

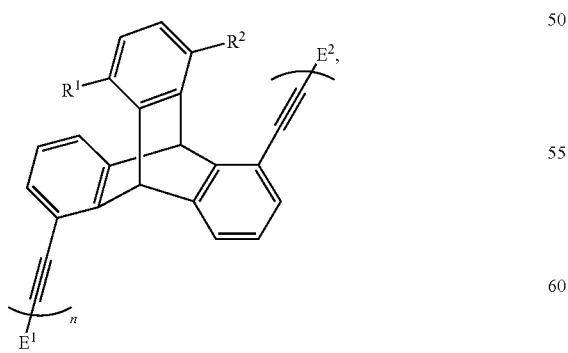

wherein $R^1$ and $R^2$ can be the same or different and are alkyl, heteroalkyl, aryl, heteroaryl, or substituted derivatives thereof.

In a particular embodiment, the polymer has the structure,

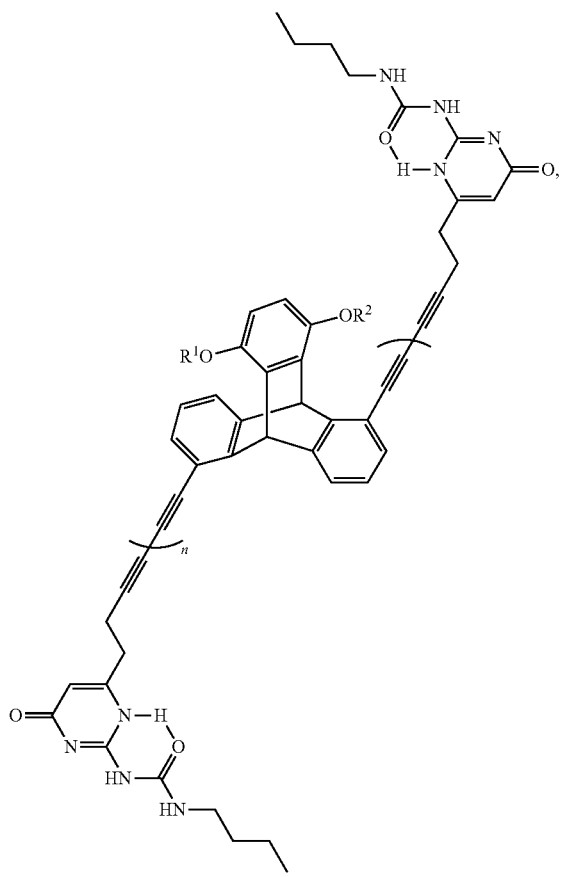

wherein $R^1$ and $R^2$ are alkyl.

As used herein, the term "polymer" or "polymer molecule" is given its ordinary meaning in the art and generally refers to extended molecular structures comprising polymer backbones and, optionally, pendant side groups. As used herein, the term "polymer backbone" refers to a linear chain of atoms within the polymer molecule by which other chains may be regarded as being pendant. In some cases, the backbone may be the longest chain of atoms within the polymer. The term "polymer" may be used to describe both polymers and oligomers. As used herein, an "oligomer" may refer to a polymer as described herein having 2-20 monomeric units. For example, an oligomer may refer to a dimer, a trimer, a tetramer, and the like. In some cases, the polymer is a conjugated polymer. The term "conjugated polymer" refers to a polymer in which electron density or electronic charge can be conducted along at least a portion of the polymer. Conjugated polymers comprise atoms capable of participating in delocalized bonding, such as pi-bonding or sigma-bonding. In some embodiments, a substantial length of the backbone (e.g., the entire backbone) may be conjugated.

Polymers of the invention may generate an emission signal. In some cases, the emission signal may be generated upon exposure to electromagnetic radiation, an electric field, a chemical reagent, or the like. As used herein, an emitted radiation or "emission" may be luminescence emission, in which "luminescence" is defined as an emission of ultraviolet or visible radiation. Specific types of luminescence include fluorescence, phosphorescence, chemiluminescence, electrochemiluminescence, and the like. In some cases, polymer of the invention may emit a signal which is visible by sight (e.g., color).

As described herein, the polymer molecule may comprise at least one interacting group at or near a terminal end of the polymer molecule, such that the polymer molecule may be connected to an adjacent polymer molecule via the at least one interacting group. As used herein, "connected to an adjacent polymer molecule via the at least one interacting group" can be defined as follows, and involves definitions of both the interacting groups and the connectivity which they provide. Interacting groups can be selected readily, by those of ordinary skill in the art, based upon the description herein as their function, examples of such groups, and knowledge herein and in the art as to simple techniques for identifying suitable groups. Interacting groups are groups which, in the context of polymer molecules used herein, can connect those molecules to each other to form networks serving functions described herein. The term "connect" encompasses any type of interaction which allows networks to be formed, as described herein and includes, without limitation, covalent bonds, ionic interactions, Van der Waals interactions, hydrogen bonds, and the like.

The interacting group may be any moiety capable of intermolecularly associating with another species, for example, an interacting group of another polymer molecule. The interaction between the two polymer molecules may comprise formation of a bond, such that the polymer molecules are connected to an adjacent polymer molecule via the bond (e.g., non-covalent bond, covalent bond). Accordingly, the interacting group may comprise functional groups capable of forming such bonds. The functional group or groups may be positioned at or near the terminal end of a polymer molecule, such that the functional groups may undergo intermolecular reaction(s) with adjacent polymer molecules, rather than intramolecular reactions, to form the polymeric network. In some cases, the interacting group may form a covalent bond with an adjacent polymer molecule via, for example, a Diels Alder reaction between a diene and a dienophile, a Michael addition between a nucleophile and an alpha-beta-unsaturated ketone, an addition reaction between a thiol and an alkene (e.g., a maleimide), a cycloaddition reaction, or a radical reaction between two species capable of forming radicals. It should be understood that covalent bonds between two polymer molecules, i.e., via the interacting groups, may be formed by other types of reactions, as known to those of ordinary skill in the art, using interacting groups comprising the appropriate functional groups to undergo such reactions.

The interacting groups may be positioned and/or functionalized such that they may interact intramolecularly, i.e., with adjacent polymer molecules, rather than intermolecularly, in order to form the polymeric network. In an illustrative embodiment, a polymer molecule may comprise a diene as a first interacting group at one terminal end of the polymer molecule and a dienophile as a second interacting group at the other terminal end of the same polymer molecule, wherein the polymer molecule is sufficiently rigid, i.e., has a substantially rigid polymer backbone, such that the diene does not undergo and intramolecular Diels-Alder reaction with the dienophile. Thus, the diene of one polymer molecule may form a covalent bond with the dienophile of another, adjacent polymer molecule, to form the polymeric network.

Figure 9A:
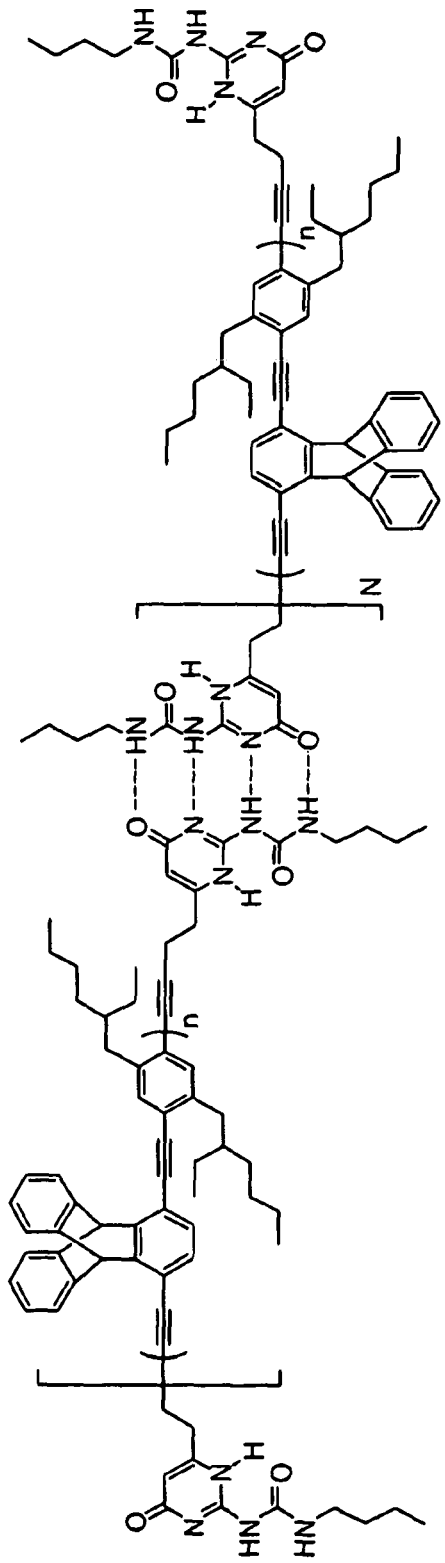
FIG. 9A shows a hydrogen-bonded polymer network, according to one embodiment of the invention.
Figure 9B:
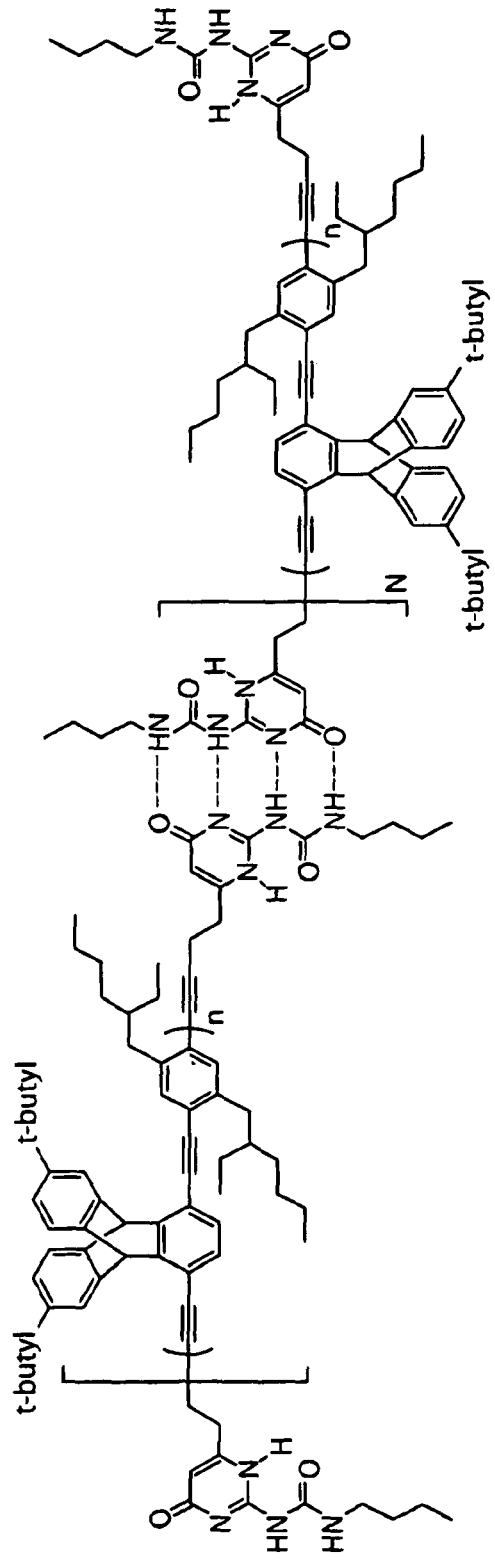
FIG. 9B shows a hydrogen-bonded polymer network, according to another embodiment of the invention.

In some cases, the interacting group may form a non-covalent bond with an adjacent polymer molecule via, for example, hydrogen-bonds, ionic bonds, dative bonds, Van der Waals interactions, or the like. In some embodiments, the interacting group forms a hydrogen-bond with an adjacent polymer molecule. Interacting groups capable of forming hydrogen-bonds include hydrogen-bond donors and acceptors. Those of ordinary skill in the art would be able to identify hydrogen-bond donors and acceptors suitable for use in the present invention. For example, a hydrogen-bond donor may comprise at least one hydrogen atom capable of interacting with a pair of electrons on a hydrogen-bond acceptor to form the hydrogen bond. In some cases, the hydrogen atom may be positioned adjacent to an electron-poor group, such as fluorine, nitro, acyl, cyano, sulfonate, or the like, to increase the acidity of the hydrogen atom and, thus, the ability of the hydrogen atom to form a hydrogen bond. In some cases, the interacting groups may comprise one or more hydrogen-bond donor/acceptor moieties. In an illustrative embodiment, the interacting group may be a ureidopyrimidinone group, which exhibits self-association constants of about $10^7$ in organic solvents. FIGS. 9A-B show examples of polymers comprising ureidopyrimidinone groups positioned at or near the terminal ends of the polymers, and the hydrogen-bonding interactions between ureidopyrimidinone groups of adjacent polymer molecules. Other examples of interacting groups which may form hydrogen bonds include carbonyl groups, amines, hydroxyls, and the like.

In some cases, the interacting groups may comprise an electron-rich or electron-poor moiety, wherein interaction between interacting groups of adjacent polymer molecules comprises an electrostatic interaction.

In some embodiments, the interacting groups of adjacent polymer molecules may interact via a biological binding event, i.e. between complementary pairs of biological molecules. For example, an interacting group may comprise an entity such as biotin that specifically binds to a complementary entity, such as avidin or streptavidin, on an adjacent polymer molecule. Other examples of interactions that occur between pairs of biological molecules including proteins, nucleic acids, glycoproteins, carbohydrates, hormones, and the like. Specific examples include an antibody/peptide pair, an antibody/antigen pair, an antibody fragment/antigen pair, an antibody/antigen fragment pair, an antibody fragment/antigen fragment pair, an antibody/hapten pair, an enzyme/substrate pair, an enzyme/inhibitor pair, an enzyme/cofactor pair, a protein/substrate pair, a nucleic acid/nucleic acid pair, a protein/nucleic acid pair, a peptide/peptide pair, a protein/protein pair, a small molecule/protein pair, a glutathione/GST pair, an anti-GFP/GFP fusion protein pair, a Myc/Max pair, a maltose/maltose binding protein pair, a carbohydrate/protein pair, a carbohydrate derivative/protein pair, a metal binding tag/metal/chelate, a peptide tag/metal ion-metal chelate pair, a peptide/NTA pair, a lectin/carbohydrate pair, a receptor/hormone pair, a receptor/effector pair, a complementary nucleic acid/nucleic acid pair, a ligand/cell surface receptor pair, a virus/ligand pair, a Protein A/antibody pair, a Protein G/antibody pair, a Protein L/antibody pair, an Fc receptor/antibody pair, a biotin/avidin pair, a biotin/streptavidin pair, a drug/target pair, a zinc finger/nucleic acid pair, a small molecule/peptide pair, a small molecule/protein pair, a small molecule/target pair, a carbohydrate/protein pair such as maltose/MBP (maltose binding protein), a small molecule/target pair, or a metal ion/chelating agent pair.

As described herein, the interacting group may also be attached to a surface in contact with the polymeric network/host material. For example, the interacting groups as described herein may be further functionalized with a group capable of forming a bond with a surface. Those of ordinary skill in the art would be able to select groups that may form a bond with a particular surface. For example, the interacting group may be functionalized with a silicon-containing group (e.g., —Si(OEt)$_3$) capable of forming a bond with silica surfaces. In other embodiments, the interacting group may be functionalized with sulfur-containing group (e.g., thiols) capable of forming a bond to metal surfaces such as gold.

Figure 11:
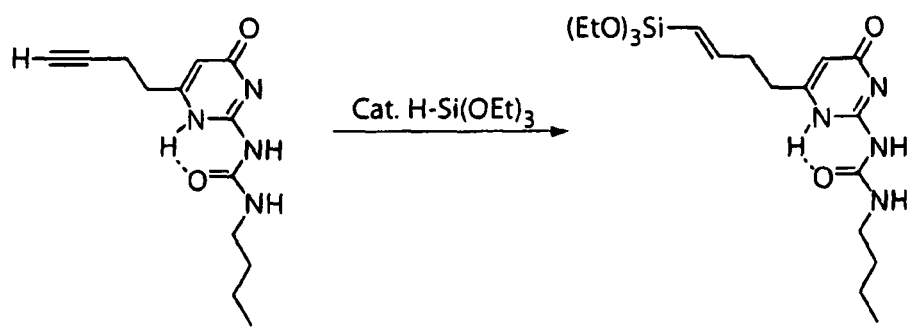
FIG. 11 shows the synthesis of a silylated ureidopyrimidinone group, according to one embodiment of the invention.

In an illustrative embodiment, FIG. 11 shows the synthesis of a silylated ureidopyrimidinone group, according to one embodiment of the invention. The silylated ureidopyrimidinone group may be attached to a silica substrate to form a functionalized surface. Contacting the functionalized surface with polymer molecules comprising ureidopyrimidinone groups at or near the terminal ends of the polymer molecules may produce a polymer network anchored at the functionalized surface. In some cases, placing polymer molecules comprising ureidopyrimidinone groups at or near the terminal ends of the polymer molecules between two such functionalized silica surfaces positioned non-perpendicular or essentially parallel to one another may produce a polymeric network having an axis that is non-parallel or essentially perpendicular to the two functionalized silica surfaces.

Materials suitable for use as a host material include, for example, solvents, polymers, liquid crystals, or other anisotropic materials capable of being aligned by methods as described herein, e.g., when mixed with polymeric networks, when in contact with a rubbed surface, upon application of an external source of energy, etc. In some cases, the polymeric network is molecularly dissolved in the host material. In one set of embodiments, the host material comprises a liquid crystal. As used herein, the term "liquid crystal" is given its ordinary meaning in the art and refers to organic or organometallic materials having certain physical properties of both liquids and solids. For example, a liquid crystal phase may have the fluidity of a liquid, but may exhibit molecular ordering and anisotropic interactions with light, as in solids. In some cases, liquid crystals suitable for use in the invention include those which are capable of forming nematic phases, chiral nematic phases, or other liquid crystal phases useful in devices involving alignment and/or switching. Examples of common liquid crystals include as cyano-biphenyls, bicyclohexyls, cyclohexylphenyls, other nematic or chiral nematic liquid crystals, and the like. A liquid crystal may comprise a plurality of liquid crystalline species, each having a primary axis aligned so as to together define a "liquid crystal director," i.e., an average axis of liquid crystalline species primary axes.

Devices, and related methods, of the invention may comprise at least one external source of energy applicable to the polymer network/host material. In some cases, the source of external energy, when applied to the polymer network/host material, may cause a change in orientation of the polymer network/host material. The source of external energy may be an electric, magnetic, optical, acoustic, electromagnetic, or mechanical field. In some embodiments, the source of external energy is an electric field. The source of external energy can be provided in combination with the device in a variety of ways, such as being integrally and/or functionally connected to the polymer network/host material (for example, by providing a compartment or other assembly supporting both the polymer network/host material and the energy source), or in combination such that the polymer network/host material and energy source can be used together (e.g., packaged together, or otherwise provided together and with the ability to arrange each, with respect to the other, for use as described herein).

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some embodiments, a straight chain or branched chain alkyl may have about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls may have from about 3 to about 10 carbon atoms in their ring structure, and alternatively about 5, 6 or 7 carbons in the ring structure. The term "heteroalkyl" is given its ordinary meaning in the art and refers to alkyl groups as described herein in which one or more atoms is a heteroatom (e.g., oxygen, nitrogen, sulfur, and the like).

The term "aryl" is given its ordinary meaning in the art and refers to aromatic groups such as, for example, 5-, 6- and 7-membered single-ring aromatic groups. The term "heteroaryl" refers to aryl groups which comprise at least one heteroatom as a ring atom, with the remainder of the ring atoms being carbon atoms. Suitable heteroatoms include oxygen, sulfur, nitrogen, phosphorus, and the like. Examples of aryl and heteroaryl groups include, but are not limited to, benzene, furan, thiophene, pyridine, pyrrole, pyrimidine, pyrazine, pyridazine, imidazole, indole, oxazole, thiazole, triazole, pyrazole, and the like, all optionally substituted.

The term "polycyclic group" or "polycyclic structure" refers to structures with two or more rings (e.g., cycloalkyls, cycloalkenyls, cycloalkynyls, aryls, heteroaryls, heterocyclyls, etc.) in which two or more atoms are common to two adjoining rings, e.g., the rings are "fused rings." For example, a "bicyclic" group contains two adjoining rings. In some cases, two rings share two common atoms which are adjacent to one another. Rings that are joined through non-adjacent atoms, e.g., three or more atoms are common to both rings, are "bridged" rings. The term "polycyclic aromatic group" refers to a polycyclic group as described herein containing at least one aromatic group. Examples of polycyclic aromatic groups include naphthalene, anthracene, phenanthrene, pyrene, and the like.

As used herein, the term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted benzene" must still comprise the benzene moiety and can not be modified by substitution, in this definition, to become, e.g., a pyridine group. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, lower alkyl, lower aryl, lower aralkyl, lower cyclic alkyl, lower heterocycloalkyl, hydroxy, lower alkoxy, lower aryloxy, perhaloalkoxy, aralkoxy, lower heteroaryl, lower heteroaryloxy, lower to heteroarylalkyl, lower heteroaralkoxy, azido, amino, halogen, lower alkylthio, oxo, lower acylalkyl, lower carboxy esters, carboxyl, -carboxamido, nitro, lower acyloxy, lower aminoalkyl, lower alkylaminoaryl, lower alkylaryl, lower alkylaminoalkyl, lower alkoxyaryl, lower arylamino, lower aralkylamino, lower alkylsulfonyl, lower-carboxamidoalkylaryl, lower-carboxamidoaryl, lower hydroxyalkyl, lower haloalkyl, lower alkylaminoalkylcarboxy-, lower aminocarboxamidoalkyl-, cyano, lower alkoxyalkyl, lower perhaloalkyl, lower arylalkyloxyalkyl, and the like.

EXAMPLES

Example 1

Figure 4:
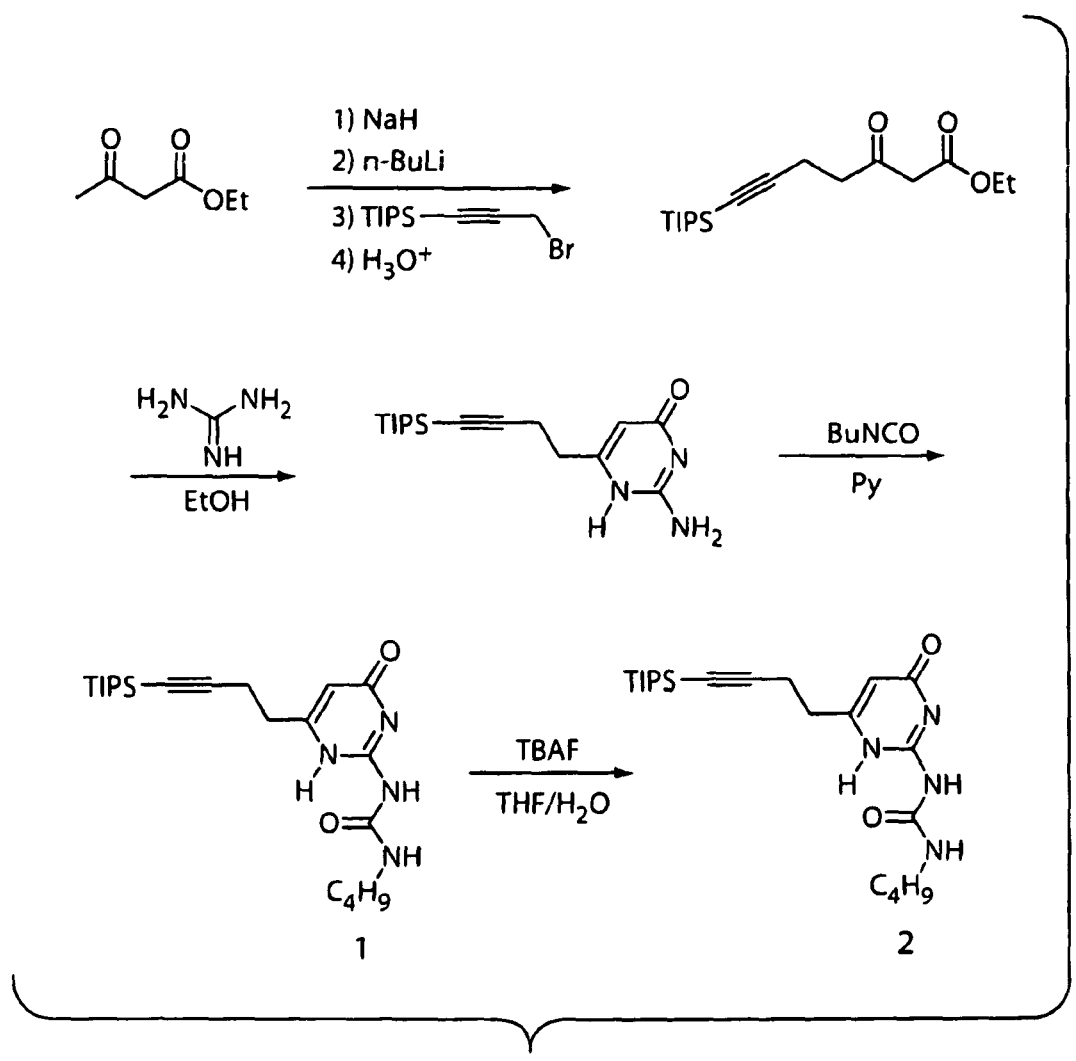
FIG. 4 shows the synthesis of a ureidopyrimidinone endgroup precursor, according to one embodiment of the invention.

To investigate the affect of the formation of extended polymeric networks on the alignment of polymers, a series of polymers were synthesized. Polymers containing interacting groups at the terminal ends of the polymer and essentially identical polymers lacking the interacting groups were synthesized, for suitable comparison. Compound 2 was synthesized as an endcapping, hydrogen-bonding, interacting group in a 4-step reaction adapted from literature procedures, in 39% isolated yield, as shown in FIG. 4 (see Hirschberg, J. H. K. K.; Beijer, F. H.; Van Aert, H. A.; Magusin, P. C, M. M.; Sijbesma, R. P.; Meijer, E. W. Macromolecules 1999, 32, 2696, for example). The triptycene compounds were synthesized according to procedures described in, for example, Zhu, Z. Z.; Swager, T. M. J. Am. Chem. Soc. 2002, 124, 9670.

As shown in FIG. 5A, endcapped polymers were synthesized by first reacting diethynyltriptycene (1 eq) and di-2,5-(2-ethylhexyl)-1,6-diiodobenzene (1 eq) under palladium-catalyzed Sonogashira conditions for a reaction time, t, upon which half of the reaction mixture was removed and isolated to serve as a "blank" (e.g., a polymer lacking the endcapping groups). Next, 0.05 eq of compound 2 was added to the remaining reaction mixture and allowed to react for 2 more hours to yield endcapped polymers. As shown in Table 1, polymer P1a was allowed to polymerize for 18 hrs, while polymer P2a was reacted for 4 hrs, to yield polymer "blanks." Polymer P1b was allowed to polymerize for 18 hrs and then was further reacted to form an endcapped polymer. Polymer P2b was reacted for 4 hrs and then was further reacted to form an endcapped polymer. The variations in the reaction times allowed for polymer growth before the addition of the endcapping moiety (Table 1), with longer reaction times (e.g., >4 hrs) giving higher molecular weight polymers with a relatively low percentage of hydrogen bonding units, which were isolated as powders that formed gels in common solvents. Shorter reaction times (e.g., <4 hrs) provided lower molecular weight polymers with a relatively higher percentage of hydrogen bonding units. These gave materials formed elastomers and gels.

TABLE 1

Physical and spectral data of polymers P1 and P2[a] a denotes the blank; b is endcapped with 2.

| Polymer | $M_n$ (KDa) | PDI | $\lambda_{max\,sol}$ (nm) | $\lambda_{max\,LC}$ (nm) | dichroic ratio |
|---|---|---|---|---|---|
| P1a (no endcap) | 15 | 2.5 | 385 | 405 | 8.7 |
| P1b (with endcap) | 18 | 2.6 | 385 | 405 | 13.2 |
| P2a (no endcap) | 3 | 2.0 | 385 | 407 | 8.5 |
| P2b (with endcap) | 3 | 2.0 | 385 | 407 | 14.2 |

Example 2

Figure 6:
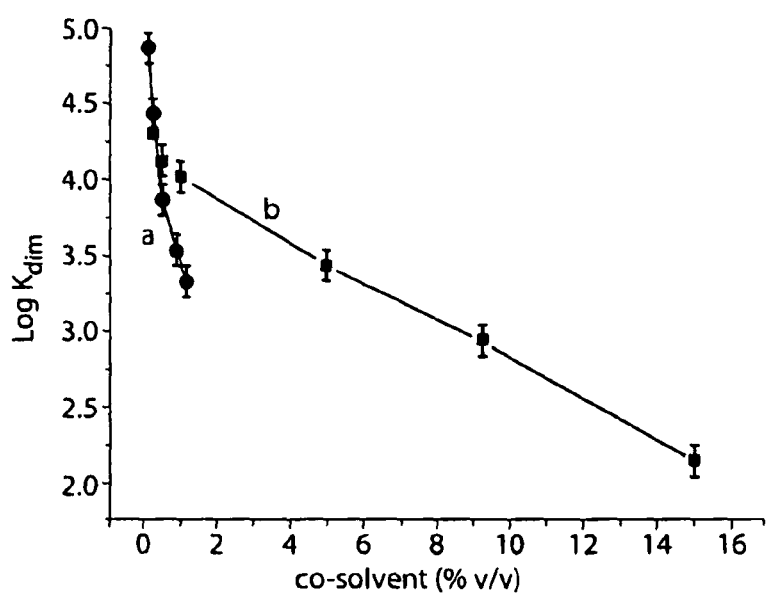
FIG. 6 shows the plot of log $K_{dim}$ of compound 1 as a function of solvent composition for $CDCl_3$ mixtures of (a) MeOD and (b) $DMSO-d_6$.

The dimerization of compound 1 was studied with NMR spectroscopy. The monomer and dimer were observed to exchanged slowly on the NMR timescale, and distinct signals were observed for both species, thereby allowing a dimerization constant to be determined by integration. In pure chloroform, the monomer concentration remained below the NMR detection limit. However, by employing hydrogen bonding co-solvent mixture (e.g., $CDCl_3$ with DMSO-$d_6$ or MeOD), the dimerization constants could be measured and $K_{dim}$ could be estimated by extrapolation to 0% co-solvent. FIG. 6 shows the plot of log $K_{dim}$ of compound 1 as a function of solvent composition for $CDCl_3$ mixtures of (a) MeOD and (b) DMSO-$d_6$. The results indicated that the lower limit for the dimerization constant is about $10^6$.

Example 3

Figure 7:
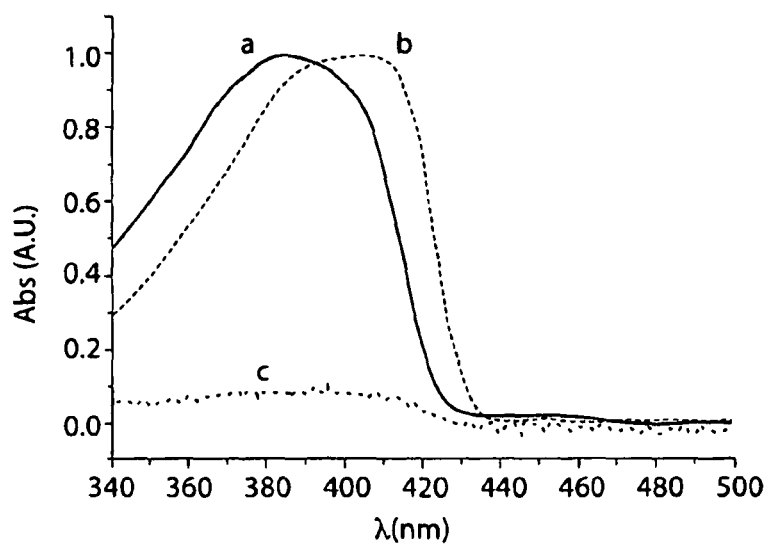
FIG. 7 shows the (a) normalized absorption spectra of polymer P2b in chloroform solution, and the polarized absorption of polymer P2b in a liquid crystal cell with (b) parallel and (c) perpendicular polarizer, with respect to the liquid crystal director.

The optical properties of polymer P2b was then studied. Polymer P2b, which contains endcapping moieties, was dissolved in either chloroform or a mixed with 5-cyanobiphenyl (5CB) in a liquid crystal cell, and the optical characteristics of the polymer were observed. FIG. 7 shows the (a) normalized absorption spectra of polymer P2b in chloroform solution, and the polarized absorption of polymer P2b in the liquid crystal cell with (b) parallel and (c) perpendicular polarizer, with respect to the liquid crystal director. The absorption spectra exhibited a characteristic peak at 385 nm for chloroform solutions of the polymers. Upon combining the polymer with 5CB and transferring the mixture to a parallel rubbed liquid crystal cell, the absorption maximum of the polymer shifted to 407 nm, indicating an increased conjugation length of the polymer.

Example 4

The alignment properties of the polymers containing the interacting groups (e.g., P1b, P2b) were studied. The dichroic ratios of the polymers P1b and P2b were measured by determining the polarized absorption of the endcapped polymers in liquid crystal solutions in parallel aligned test cells. FIG. 7B shows the polarized absorption of polymer P2b in the liquid crystal cell when positioned parallel to the liquid crystal director, while FIG. 7B shows the polarized absorption of polymer P2b in the liquid crystal cell when positioned perpendicular to the liquid crystal director. The decrease in the absorption spectrum observed upon moving the cell from a position parallel to the liquid crystal director to a position perpendicular to the liquid crystal director indicates the high degree of alignment of polymer P2b with the liquid crystal director. As shown by the polarized absorption data in Table 1, the polymers endcapped with compound 2 displayed higher dichroic ratios than their non-functionalized counterparts, suggesting that endcapping the polymers with compound 2 dramatically increases the polymer ordering, even at the low concentration of polymers used in these experiments (0.6 w % P1 and 0.78 w % P2).

Example 5

To further investigate the effect of the hydrogen-bonded polymeric network on dichroic ratio, control experiments were conducted wherein an excess of a species containing a single hydrogen-bonding group was added to disrupt the polymeric network. An excess of compound 1 was added to either polymer to P1b or polymer P2b, and the dichroic ratio of each mixture was measured.

Figure 8:
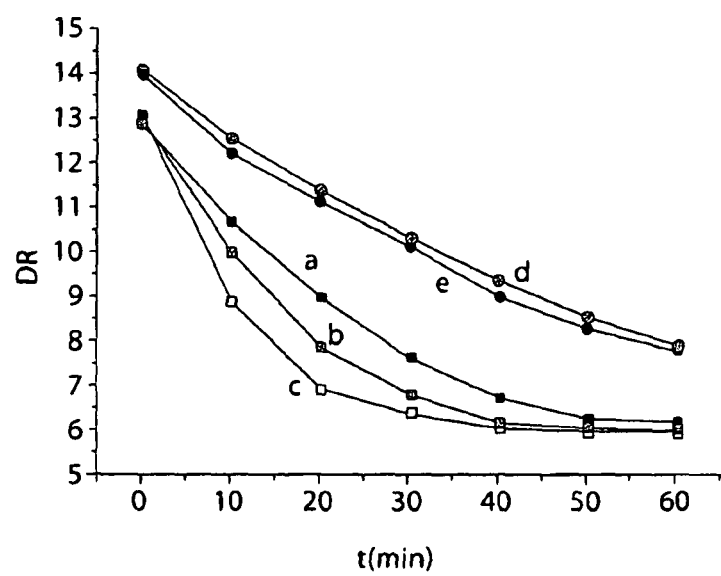
FIG. 8 shows the dichroic ratio of compounds P1b and P2b as a function of time upon the addition of (a) 4.4 mM polymer P1b, (b) 9.6 mM polymer P1b, (c) 19.2 mM polymer, P1b, (d) 3.8 mM polymer P2b, and (e) 16.2 mM polymer P2b.

FIG. 8 shows the dichroic ratio of compounds P1b and P2b as a function of time upon the addition of (a) 4.4 mM polymer P1b, (b) 9.6 mM polymer P1b, (c) 19.2 mM polymer, P1b, (d) 3.8 mM polymer P2b, and (e) 16.2 mM polymer P2b. As shown in FIG. 8, the dichroic ratio was observed to decreased in time and leveled off around the dichroic ratio values obtained for polymer P1a and polymer P2a, i.e., the polymers without hydrogen-bonding groups. Control experiments were also conducted with polymer P1a and polymer P2a and found no change in dichroic ratio upon addition of similar amounts of compound 1, indicating that extended, polymers networks, created by intermolecular hydrogen bonding, have increased ordering and that the materials are still able to equilibrate with other hydrogen bonding donors.

Example 6

The effect of hydrogen-bonded polymeric networks as described herein on liquid crystal phases was investigated.

Figure 10:
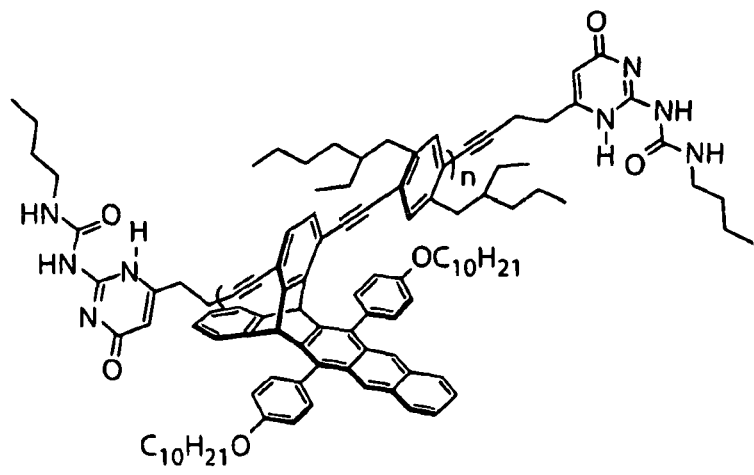
FIG. 10 shows examples of poly(phenylene ethynylene)s comprising ureidopyrimidinone endgroups, according to some embodiments of the invention.
Figure 10:
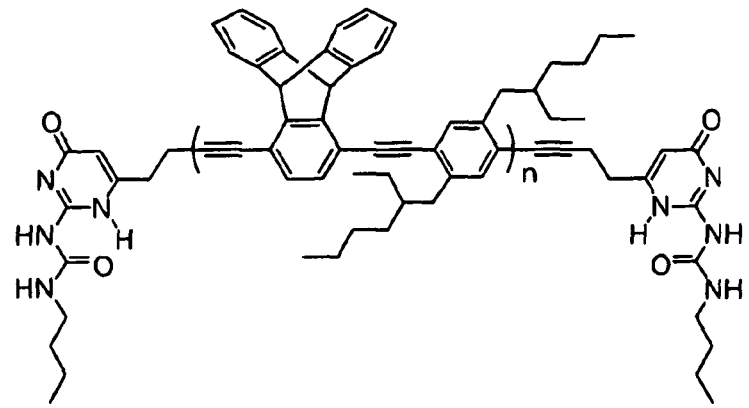

Polymers P4 and P5, as shown in FIG. 10, were synthesized and each was combined with a series of nematic liquid crystal host materials. Table 2 shows the nematic to isotropic phase transitions of the liquid crystal compositions, when combined with Polymer P4 or Polymer P5. Significant stabilization was shown for the negative dielectric ($-\Delta\in$) liquid crystal mixture with the addition of about 0.5 wt % of the polymers. The increased stability of the liquid crystal compositions upon introduction of polymers P4 and P5, even at low concentrations (e.g., 1 wt %, 0.5 wt %), indicates that the liquid crystal has greater order in the presence of the polymer and can lead to greater optical anisotropy and greater orientational stability. Furthermore, incorporation of polymers as described herein within liquid crystal host materials may produce improved electrooptical contrast and/or switching in liquid crystal devices.

TABLE 2

Table of the nematic to isotropic phase transitions of a series of liquid crystal compositions with polymers P3 and P4.

| | MLC-6884 −Δe Merck Mixture | 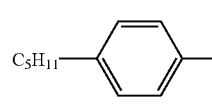 5CB | 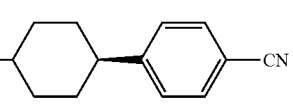 5PCH |
|---|---|---|---|
| Pure LC | 74.2 | 33.9 | 54.4 |
| Polymer P4 (wt %) | 79.4 (0.62) | 33.8 (0.52) | 52.7 (0.46) |
| Polymer P5 (wt %) | 80.1 (0.43) | 33.5 (0.55) | 53.6 (0.47) |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:
1. A device, comprising:
a polymeric network comprising an assembly of a plurality of polymer molecules, wherein the polymer molecule has the structure,

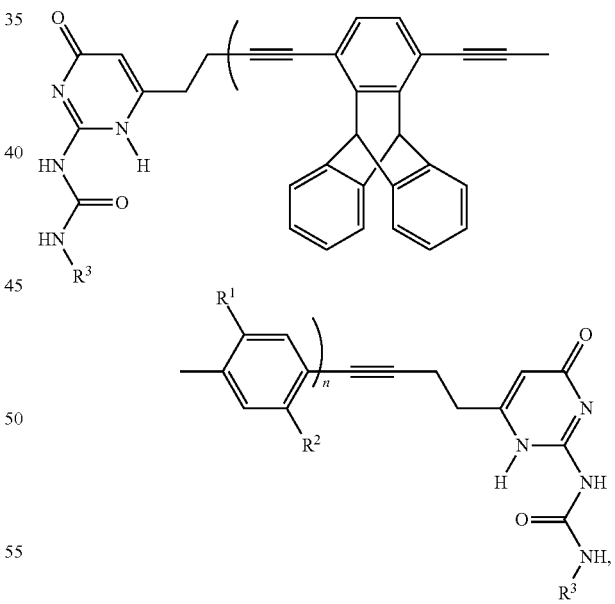

wherein each polymer molecule is capable of forming a non-covalent bond with a bonding group of an adjacent polymer molecule, and wherein at least 50% of the plurality of polymer molecules are connected to an adjacent polymer molecule via the at least two bonding groups, wherein $R^1$ and $R^2$ are 2-ethylhexyl, and $R^3$ is butyl; and
a host material with which the polymeric network is mixed, wherein the polymeric network is capable of orienting the host material.

2. A device, comprising:
a polymeric network comprising an assembly of a plurality of polymer molecules, wherein each polymer molecule comprises at least two intermolecular bonding groups, each bonding group attached at a terminal end of the polymeric molecule and capable of forming a non-covalent bond with a bonding group of an adjacent polymer molecule, and wherein at least 50% of the plurality of polymer molecules are connected to an adjacent polymer molecule via the at least two bonding groups;
a host material with which the polymeric network is mixed, wherein the polymeric network is capable of orienting the host material; and
a second polymeric network with which the host material is mixed, wherein the second polymeric network is capable of orienting the host material.

3. A device as in claim 2, wherein the polymer molecules are connected to an adjacent polymer molecule via a non-covalent bond.

4. A device as in claim 3, wherein the non-covalent bond is a hydrogen bond, ionic bond, dative bond, or Vander Waals interaction.

5. A device as in claim 3, wherein the non-covalent bond is a hydrogen bond.

6. A device as in claim 2, wherein the polymer molecule is a poly(arylene), poly(arylenevinylene), poly(aryleneethylnylene), or substituted derivatives thereof.

7. A device as in claim 2, wherein the polymer molecule is poly(aryleneethylnylene).

8. A device as in claim 2, wherein the polymer molecule has the structure,

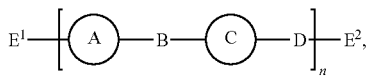

wherein n is at least 1, A and C are optionally substituted aromatic groups; B and D are absent, alkene, alkyne, heteroalkene, or heteroalkyne; and $E^1$ and $E^2$ can be the same or different and are bonding groups.

9. A device as in claim 8, wherein $E^1$ and $E^2$ are groups capable of forming hydrogen bonds with an adjacent polymer molecule.

10. A device as in claim 8, wherein the polymer molecule has the structure,

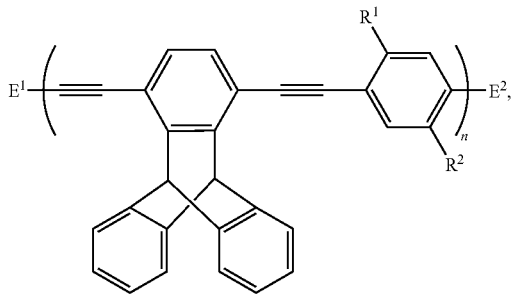

wherein $R^1$ and $R^2$ can be the same or different and are alkyl, heteroalkyl, aryl, heteroaryl, or substituted derivatives thereof.

11. A device as in claim 2, wherein at least 60% of the polymer molecules are connected to an adjacent polymer molecule via the at least two bonding groups.

12. A device as in claim 2, wherein at least 70% of the polymer molecules are connected to an adjacent polymer molecule via the at least two bonding groups.

13. A device as in claim 2, wherein at least 80% of the polymer molecules are connected to an adjacent polymer molecule via the at least two bonding groups.

14. A device as in claim 2, wherein at least 90% of the polymer molecules are connected to an adjacent polymer molecule via the at least two bonding groups.

15. A device as in claim 1, wherein the host material comprises a liquid crystal.

16. A device as in claim 2, wherein the host material comprises a liquid crystal.

17. A device as in claim 2, wherein the dichroic ratio of the polymeric network is at least 10% greater than the dichroic ratio of a polymer molecule essentially identical, but lacking the bonding groups, under essentially identical conditions.

18. A device as in claim 2, wherein the dichroic ratio of the polymeric network is at least 20% greater than the dichroic ratio of a polymer molecule essentially identical, but lacking the bonding groups, under essentially identical conditions.

19. A device as in claim 2, wherein the dichroic ratio of the polymeric network is at least 30% greater than the dichroic ratio of a polymer molecule essentially identical, but lacking the bonding groups, under essentially identical conditions.

20. A device as in claim 2, wherein the dichroic ratio of the polymeric network is at least 40% greater than the dichroic ratio of a polymer molecule essentially identical, but lacking the bonding groups, under essentially identical conditions.

21. A device as in claim 2, wherein the dichroic ratio of the polymeric network is at least 50% greater than the dichroic ratio of a polymer molecule essentially identical, but lacking the bonding groups, under essentially identical conditions.

22. A device as in claim 2, wherein the dichroic ratio of the polymeric network is at least 60% greater than the dichroic ratio of a polymer molecule essentially identical, but lacking the bonding groups, under essentially identical conditions.

23. A device as in claim 2, wherein the dichroic ratio of the polymeric network is at least 70% greater than the dichroic ratio of a polymer molecule essentially identical, but lacking the bonding groups, under essentially identical conditions.

24. A device as in claim 2, further comprising a surface in contact with the host material, wherein the surface is capable of orienting the host material.

25. A device as in claim 2, wherein the device is constructed and arranged to display a change in color upon application of a source of energy to the device.

26. A device as in claim 2, wherein the device is constructed and arranged to display a change in luminescence upon application of a source of energy to the device.

27. A device as in claim 2, wherein the device is constructed and arranged to display a change in transmission of an optical signal upon application of a source of energy to the device.

28. A device as in claim 2, wherein the device is constructed and arranged to display a signal recognizable to a human upon application of a source of energy to the device.

29. A device as in claim 2, wherein application of a source of energy to the device causes switching in a liquid crystal display.

30. A device as in claim 2, wherein the device is a bistable liquid crystal device.

31. A device as in claim 8, wherein the polymer molecule comprises a group having the structure,

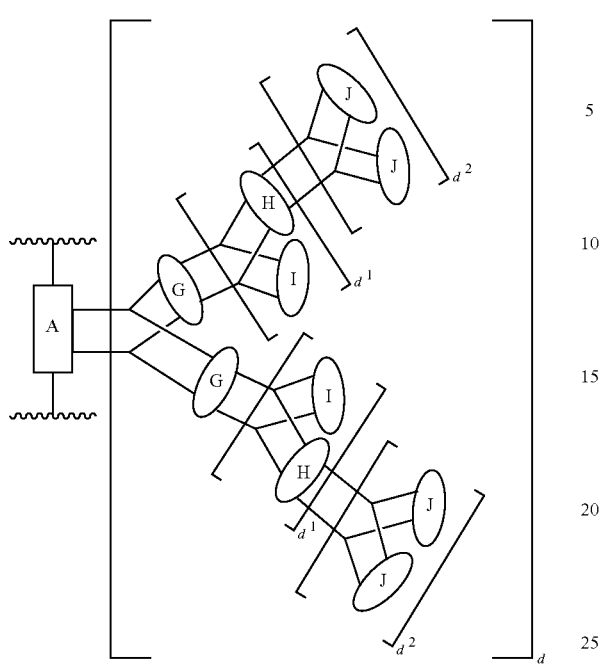
wherein G, H, I, and J are aromatic groups, d =1, 2, and d¹ =0, 1, such that when d¹ =0, d² =0 and when d¹ =1, d² =0, 1.
32. A device as in claim 31, wherein G and H can be the same or different and are:
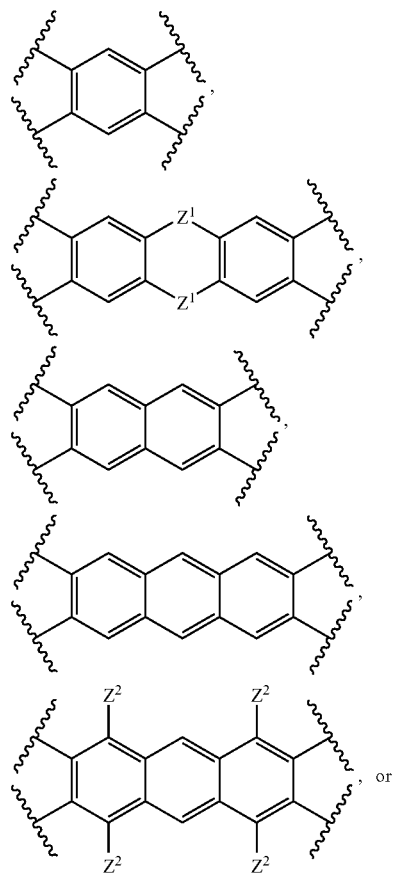, or
-continued
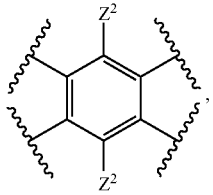,
optionally substituted, I and J may be the same or different and are:
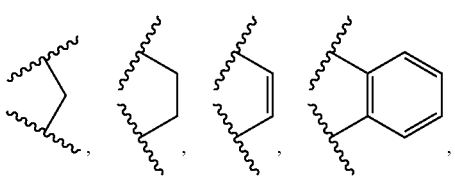,
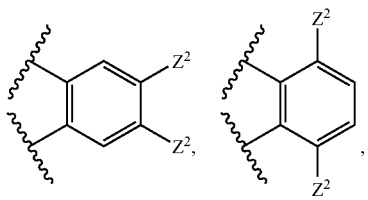,
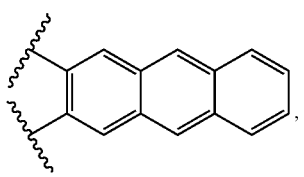, -continued

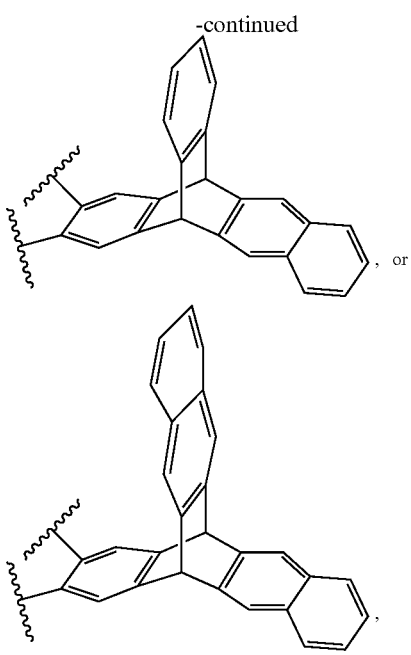

, or

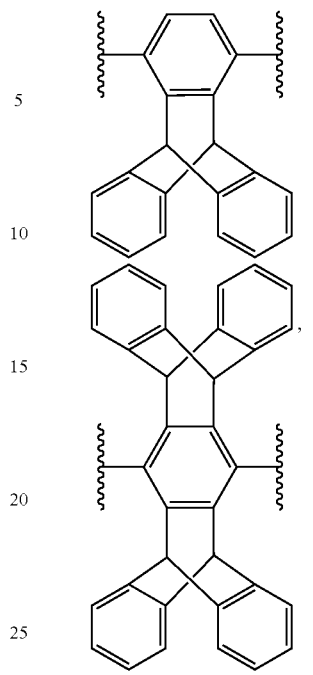

, optionally substituted,
wherein each $Z^1$ can be the same or different and $Z^1$ is O, S or NR, wherein R is hydrogen, alkyl, heteroalkyl, aryl, or heteroaryl, optionally substituted, and each $Z^2$ can be the same or different and $Z^2$ is halide, alkyl, heteroalkyl, aryl, or heteroaryl, optionally substituted.

33. A device as in claim 8, wherein the polymer molecule comprises a group having the following structure, optionally substituted.

34. A device as in claim 2, further comprising a surface in contact with the polymeric network, wherein the surface is connected to at least a portion of the polymeric network via a non-covalent bond.

* * * * *